United States Patent
Darouich et al.

(10) Patent No.: US 10,726,284 B2
(45) Date of Patent: Jul. 28, 2020

(54) DEVICE FOR SELECTING AND DESCRIBING POINTS OF INTEREST IN A SEQUENCE OF IMAGES, FOR EXAMPLE FOR THE PAIRING OF POINTS OF INTEREST

(71) Applicant: COMMISSARIAT A L'ENERGIE ATOMIQUE ET AUX ENERGIES ALTERNATIVES, Paris (FR)

(72) Inventors: Mehdi Darouich, Fontenay aux Roses (FR); Maria Lepecq, Bourg-la-Reine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 159 days.

(21) Appl. No.: 16/069,878

(22) PCT Filed: Jan. 12, 2017

(86) PCT No.: PCT/EP2017/050569
§ 371 (c)(1),
(2) Date: Jul. 12, 2018

(87) PCT Pub. No.: WO2017/121804
PCT Pub. Date: Jul. 20, 2017

(65) Prior Publication Data
US 2019/0057269 A1    Feb. 21, 2019

(30) Foreign Application Priority Data
Jan. 13, 2016 (FR) .................................. 16 50238

(51) Int. Cl.
*G06K 9/00* (2006.01)
*G06K 9/46* (2006.01)
(Continued)

(52) U.S. Cl.
CPC ..... *G06K 9/00973* (2013.01); *G06K 9/00993* (2013.01); *G06K 9/4671* (2013.01);
(Continued)

(58) Field of Classification Search
CPC ............. G06K 9/00973; G06K 9/4671; G06K 9/6202; G06K 9/6228; G06K 9/00993; G06T 1/20
See application file for complete search history.

(56) References Cited

U.S. PATENT DOCUMENTS

| 6,711,293 B1 | 3/2004 | Lowe |
| 2008/0159590 A1* | 7/2008 | Yi ...................... G06K 9/00711 382/103 |

(Continued)

FOREIGN PATENT DOCUMENTS

| CN | 104 182 974 A | 12/2014 |
| EP | 2 027 558 A2 | 2/2009 |
| WO | 2007/128452 A2 | 11/2007 |

OTHER PUBLICATIONS

Wang, et al., "An Embedded System-on-Chip Architecture for Real-time Visual Detection and Matching", IEEE Transactions on Circuits and Systems for Video Technology, IEEE Service Center, vol. 24, Issue: 3, pp. 525-538, Mar. 1, 2014, XP011542198.

(Continued)

*Primary Examiner* — Ming Y Hon
(74) *Attorney, Agent, or Firm* — Baker & Hostetler LLP

(57) ABSTRACT

A calculation device, for the selection and the description of points of interest in at least one image decomposed into a plurality of strips, includes a first module for selecting and indexing points of interest from among a set of points of interest detected in the image, the first module being configured to select, in each strip, at most a fixed number P of candidate points of interest, and associate a unique index with them, a second module for managing calculation of (Continued)

descriptors for the candidate points of interest, the first module being configured to transmit the candidate points of interest and their index to the second module immediately at the end of the processing of K lines of a strip, with K an integer number greater than or equal to 1 and strictly less than the number of lines per strip.

12 Claims, 26 Drawing Sheets

(51) Int. Cl.
    *G06T 1/00*           (2006.01)
    *G06T 1/20*           (2006.01)
    *G06K 9/62*           (2006.01)

(52) U.S. Cl.
    CPC ......... *G06K 9/6202* (2013.01); *G06K 9/6228* (2013.01); *G06T 1/20* (2013.01)

(56) References Cited

U.S. PATENT DOCUMENTS

| | | | | |
|---|---|---|---|---|
| 2012/0183228 A1* | 7/2012 | Huggett | ............... | G06K 9/6211 382/218 |
| 2013/0136310 A1* | 5/2013 | Hofman | ............... | G06K 9/6282 382/105 |
| 2013/0142439 A1* | 6/2013 | Xin | ...................... | G06K 9/4671 382/201 |
| 2013/0216097 A1 | 8/2013 | Pau et al. | | |
| 2013/0243341 A1* | 9/2013 | Iakovenko | ........... | G06K 9/4671 382/218 |
| 2014/0185941 A1* | 7/2014 | Li | ........................ | G06K 9/4671 382/201 |
| 2015/0055839 A1* | 2/2015 | Wu | ........................... | G06T 5/50 382/131 |
| 2016/0371634 A1* | 12/2016 | Kumar | ................. | G06K 9/6212 |
| 2017/0076145 A1* | 3/2017 | Gottemukkula | ... | G06K 9/00288 |

OTHER PUBLICATIONS

Fan, et al., "Implementation of high performance hardware architecture of OpenSURF algorithm on FPGA", International Conference on Field-Programmable Technology (FPT), IEEE, pp. 152-159, Dec. 9, 2013, XP032555009.

Chen, et al., "A real-time FPGA-based architecture for OpenSURF", Proceedings of the SPIE, vol. 9813, pp. 98130K-1-98130K-8, Dec. 14, 2015, XP060063198.

Lowe, et al., "Distinctive Image Features from Scale-Invariant Keypoints", International Journal of Computer Vision, vol. 60, Issue 2, pp. 91-110, Jan. 1, 2004, XP002377339.

Chen, et al., "Adaptive Pipeline Parallelism for Image Feature Extraction Algorithms", 2012 41st International Conference on Parallel Processing, Sep. 2012.

* cited by examiner

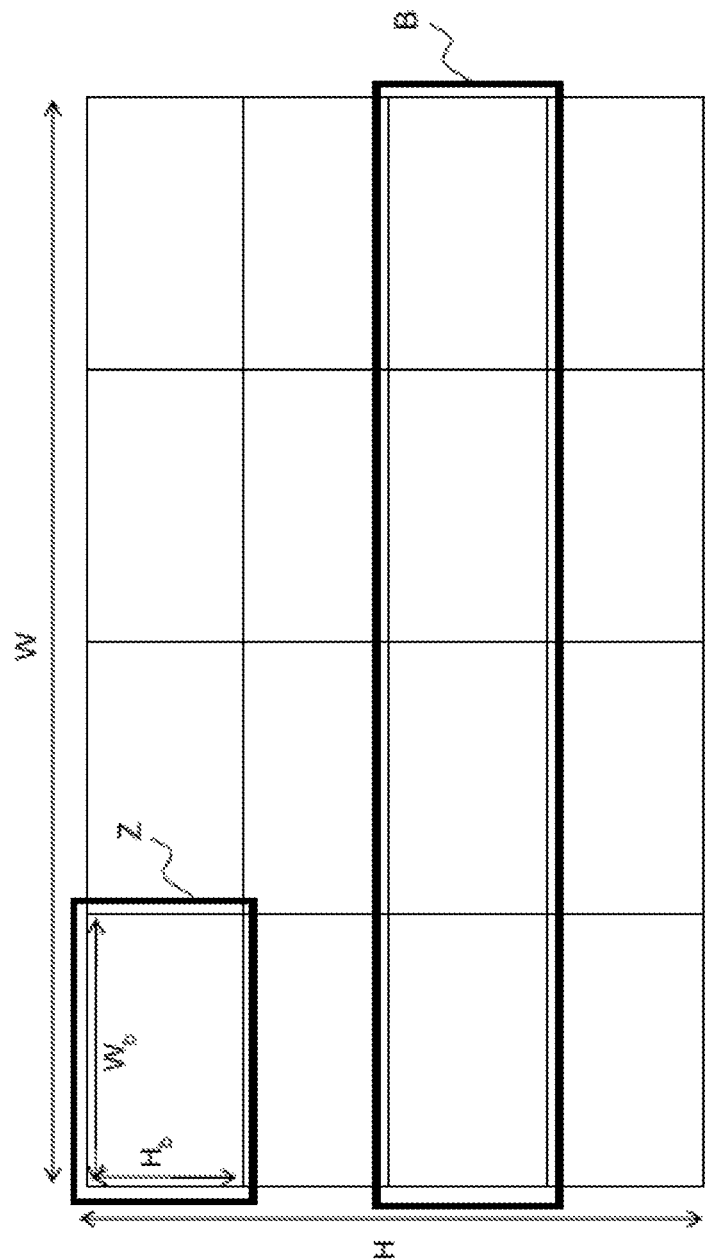
FIG.2bis

DEVICE FOR SELECTING AND DESCRIBING POINTS OF INTEREST IN A SEQUENCE OF IMAGES, FOR EXAMPLE FOR THE PAIRING OF POINTS OF INTEREST

CROSS-REFERENCE TO RELATED APPLICATIONS

This application is a National Stage of International patent application PCT/EP2017/050569, filed on Jan. 12, 2017, which claims priority to foreign French patent application No. FR 1650238, filed on Jan. 13, 2016, the disclosures of which are incorporated by reference in their entirety.

FIELD OF THE INVENTION

The invention relates to the field of architectures of embedded calculators for image processing applications and more specifically for computer vision applications.

The invention pertains more specifically to a calculation device implementing a function for selecting and describing points of interest in a sequence of images, this function being particularly significant in the field of computer vision and in particular for scene analysis in a stream of images.

The invention also pertains to the application of such a device to carry out a function for pairing points of interest described between two images, belonging to the same sequence or to two different sequences.

BACKGROUND

The identification and the use of points of interest in an image is a well-known function in the field of embedded vision.

Usually, one distinguishes three main functions which utilize the notion of points of interest in an image: a first function for detecting points of interest in an image or a sequence of images, a second function for calculating descriptors for the points of interest detected by the first function and a third function for pairing points of interest arising from two distinct images on the basis of the calculated descriptors.

FIG. 1 shows diagrammatically the stringing together of these three functions in the context of a device for pairing points of interest between two images (image 1, image 2).

The first detection function consists in determining the position, in an image, of noteworthy points, called points of interest which are points whose position may evolve temporally but whose presence is relatively stable from image to image. These points of interest may be for example corners, edges or other elements of a scene that are characterizable, by a given detection method. The known methods for detecting points of interest produce, for each point of interest, at least its position in the plane of the image and a detection score. Other data characterizing the point of interest can be generated such as the orientation or the scale factor of the point of interest.

The aim of the second function for calculating descriptors is to describe each point of interest in a robust manner. The existing methods are often based on the interpretation of the neighborhood of pixels around the position of the point of interest. For each point of interest, a vector structure called a descriptor is generated whose size varies as a function of the method used.

There are numerous methods for detecting and describing points of interest in an image. Two examples are in particular described in U.S. Pat. No. 6,711,293 which describes the method known by the acronym SIFT "Scale Invariant Feature Transform" and in European patent EP2027558 which describes the method known by the acronym SURF "Speeded Up Robust Features".

The aim of the third function for pairing points of interest is to associate each point of interest detected in an image with the points of interest detected in another reference image. The reference image can be an earlier image of the same stream from which the analyzed image originates or an image originating from another stream but which corresponds to a snapshot of the same scene or else an image arising from a statistical database. The pairing step uses the descriptors calculated during the second step to associate two points of interest according to a proximity or resemblance criterion.

Methods for pairing points of interest are applicable in particular in the field of object tracking for which a pairing is performed between an image N and an earlier image N−k in the same image stream, one then speaks of temporal pairing. Another envisaged application relates to stereovision for which a pairing is carried out between two images from a viewpoint of the same scene in two different streams of images, one then speaks of spatial pairing. Still further applications are aimed at pairing an image with a prerecorded model.

The invention which is described in greater detail hereinafter in the document pertains to a particular architecture of a calculation device compatible with any method for detecting, describing and pairing points of interest.

The number of detectable points of interest in an image is not deterministic. Indeed, this number depends on the intrinsic characteristics of the image and is not predictable. Furthermore the calculation of descriptor on a point of interest is a relatively complex calculation according to the method used, thus implying that the calculation of the descriptors for the points of interest of an entire image is a very time-consuming approach in terms of calculation. In a context of embedded applications for which a real-time processing constraint exists, the step of calculating descriptors may lead to the breaking of the real-time requirements in the global operation of the pairing architecture.

Another problem arises from the fact that the steps of detecting and describing points of interest use neighborhoods of pixels of the image and involve storing a large portion of the image or indeed, quite often, the complete image. However, the use of a memory dimensioned to save a complete image is quite often incompatible with the low latency constraint imposed by the real-time requirement as well as with the constraints of memory areas available on an embedded architecture.

The problem envisaged by the invention therefore consists in designing a real-time architecture for the implementation of a method for selecting and describing and/or for pairing points of interest with non-deterministic distribution in an image received as a real-time stream which makes it possible to comply with the constraints in respect of execution speed, low latency and minimization of memory areas.

A first known solution making it possible to implement in purely software form a method for pairing points of interest consists in stringing together the three steps described hereinabove while performing the processings on the entirety of an image. This solution is not compatible with an embedded hardware architecture with real-time constraints for the reasons mentioned previously.

Solutions of hardware implementation of such algorithms are moreover known. The document "Implementation of High Performance hardware architecture of OpenSURF algorithm on FPGA, Xitian Fan, 2013" describes the implementation of a method which bases its detection and its description of points of interest on the SURF algorithm. The extraction of points of interest is performed without any sorting and all the points of interest detected are described. The processing time thus depends on the number of points of interest extracted. The drawbacks of this solution are the same as those already mentioned.

The solution described in the document "An embedded system-on-chip architecture for real time visual detection and matching, Jianhui Wang, 2013" is also known. This document describes an implementation of a method which comprises a step of detecting points of interest which is based on the SIFT algorithm and a step of describing points of interest and of pairing which is based on the BRIEF (Binary Robust Independent Elementary Features) algorithm. The detected points of interest are placed in a queue of the FIFO type and are processed one by one by the description step. The calculational load and the synchronization aspects are managed by a mechanism which tests the position of a point of interest with respect to the image neighborhood area in memory. If the point of interest is received in advance with respect to the refreshing of the neighborhood memory area, a blocking waiting mechanism is engaged. If on the contrary, the point of interest is received with a delay, it is not processed and one passes directly to the next point of interest.

This solution is not very robust to a non-homogeneous local distribution of the points of interest in the image. Indeed, if many points of interest are received located in an area of the image, there is a risk of losing a lot thereof. Likewise if no point of interest is received in a large area of the image, a significant timeslot is unutilized. Furthermore, the pairing step contains a double loop nested over the set of points of interest. It is necessary for all the points of interest of an image to be calculated to undertake a pairing with another image. This aspect introduces high latency for stereovision applications where the two images are processed simultaneously. Furthermore, two image memories are necessary.

SUMMARY OF THE INVENTION

The invention is aimed at solving the limitations of the prior art solutions, such as mentioned hereinabove, by proposing an architecture of a calculation device for pairing points of interest which allows a processing of the image by strips or by areas so as to be able to accelerate the processing of the steps of describing points of interest and of pairing while limiting the number of calculations to be performed. The invention is accordingly based on a speculative approach of calculating points of interest making it possible to comply with the constraints imposed by the image stream (pixel tempo) by virtue of a mechanism of unique indexation of the selected points of interest facilitating the management of the data streams between the functional bricks. It makes it possible furthermore to circumvent image memories when stringing together between functional bricks and during the calculations for pairing points of interest.

The invention thus relates to a calculation device for the selection and the description of points of interest in at least one image decomposed into a plurality of strips, said device comprising:
 a first module for selecting and indexing points of interest from among a set of points of interest detected in the image, said first module being configured to select, in each strip, at most a fixed number P of candidate points of interest, and associate a unique index with them,
 a second module for managing calculation of descriptors for the candidate points of interest,
 the first module being configured to transmit the candidate points of interest and their index to the second module immediately at the end of the processing of K lines of a strip, with K an integer number greater than or equal to 1 and strictly less than the number of lines per strip.

According to a particular aspect of the invention, the calculation device furthermore comprises at least one neighborhood memory interfaced with the second module for the calculation of descriptors of points of interest and a synchronization circuit able to receive a sequence of images in the form of a stream of pixels and to transmit said stream of pixels to the neighborhood memory with a delay configured to synchronize the content of the neighborhood memory with the calculation of a descriptor of a current point of interest.

According to a particular aspect of the invention, the selection of P points of interest which is effected by the first module consists in selecting, at a given instant, the P points of interest having the highest detection score or the lowest detection score or in selecting the P points of interest in a chronological or random order.

According to a particular aspect of the invention, the second module comprises at least one queue configured to receive the candidate points of interest transmitted by the first module for selecting points of interest, at least one facility for controlling calculation of descriptors of points of interest which is designed to cooperate with at least one unit for calculating descriptors of points of interest, at least one strip memory dimensioned to save the candidate points of interest and their calculated descriptors at a unique address and an addressing management facility configured to generate said unique address on the basis of at least the unique index provided by the first selection module.

According to a particular aspect of the invention, each strip is furthermore decomposed into a plurality of selection areas, the selection of P points of interest being effected per selection area.

According to a particular aspect of the invention, said unique address is furthermore generated on the basis of an identifier of the selection area of the point of interest to be saved.

According to a particular aspect of the invention, the second module comprises a facility for controlling calculation of descriptors of points of interest and a queue for one or more selection area(s).

According to a particular aspect of the invention, at least one neighborhood memory is dimensioned to contain solely an area of an image necessary for the calculation of the descriptors for the points of interest corresponding to K lines of one or more selection areas of a strip.

According to a particular variant, the calculation device according to the invention furthermore comprises a third module for pairing points of interest detected and selected in a reference image and a test image on the basis of their associated descriptors saved respectively in a first set of strip memories and a second set of strip memories, said third pairing module being configured to independently read-access any one of the strip memories associated with the reference image and with the test image.

According to a particular aspect of the invention, the third pairing module comprises a pairing control facility to pilot a pairing calculation unit, a set of pairing strip memories which is associated with the reference image and a set of pairing strip memories which is associated with the test image, each pairing strip memory being able to save at least one point of interest and a pairing score.

According to a particular aspect of the invention, the pairing is carried out in a spatial search area of the image by comparing each point of interest to be paired of the reference image saved in a strip memory with the points of interest of the test image which are situated in the spatial search area centered on the position of the point of interest to be paired and are saved in at least one strip memory, the pairing search being limited to the strip memories of the test image which correspond to strips of the test image which have a non-empty intersection with the spatial search area.

According to a particular aspect of the invention, the reference image and the test image are temporally successive images or are images of the same scene originating from two different streams of images.

BRIEF DESCRIPTION OF THE DRAWINGS

Other characteristics and advantages of the present invention will become better apparent on reading the description which follows in conjunction with the appended drawings which represent.

DETAILED DESCRIPTION

Figure 2:
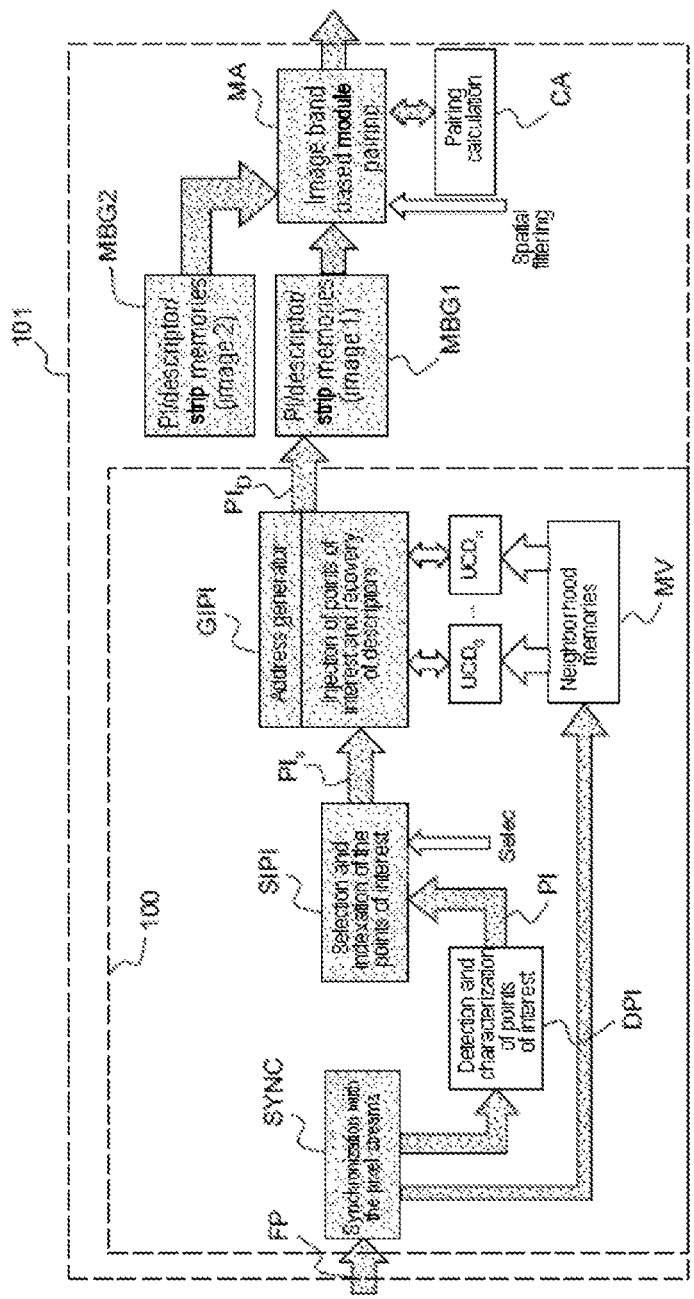
FIG. 2bis, a diagram illustrating a particular splitting up of an image with a view to its processing by the calculation device according to the invention, FIGS. 3a-3x, several diagrams describing the architecture of a first module for selecting and indexing points of interest belonging to the device according to the invention, FIGS. 4a-4g, several diagrams describing the architecture of a second module relating to the description of points of interest, belonging to the device according to the invention, FIG. 5, a diagram illustrating a mechanism for pairing points of interest such as is implemented by a solution of the prior art, FIGS. 6 and 7 two diagrams describing the operation of the module for pairing by image band according to a second embodiment of the invention, FIG. 8, a diagram illustrating a mechanism for pairing points of interest implemented by the device according to the second embodiment of the invention.

FIG. 2 represents a schematic of the architecture of a calculation device according to a first embodiment 100 of the invention and a second embodiment 101 of the invention.

In the first embodiment, the device 100 comprises mainly:
a first module for synchronization SYNC of an incoming stream of pixels FP, the pixels belonging to the images of a sequence of images,
a second module SIPI for selecting and indexing points of interest from among a set of points of interest PI detected and characterized within an image belonging to the stream of images FP,
a third module GIPI for managing the calculation of descriptors of the points of interest selected $PI_s$, executing the functions of address generation, of injecting points of interest and of recovering descriptors.

Furthermore, the first module SYNC for synchronization and the second module SIPI for selecting and indexing points of interest interact with a module DPI for detecting and characterizing points of interest within the stream of pixels FP.

The third module GIPI interacts with several descriptor calculation units $UCD_0, \ldots UCD_n$ which are themselves connected to one or more neighborhood memory/memories MV in respect of a point of interest. A neighborhood memory MV is fed by the stream of pixels FP, optionally synchronized temporally by the first module SYNC.

In the second embodiment, the device 101 furthermore comprises a fourth module MA for pairing by image band and at least two points of interest/descriptors strip memories MBG1, MBG2 to which the fourth module MA is linked.

The points of interest/descriptors strip memories MBG1, MBG2 are fed by the points of interest described $PI_D$ provided as output from the third module GIPI.

The fourth module MA for pairing interacts with a module CA for calculating pairing of points of interest.

The general operation of the architecture disclosed in FIG. 2 is described firstly. A stream of pixels FP comprising a succession of pixels belonging to several images arising, for example, from a video stream, is received in real time by a synchronization module SYNC. The role of this module SYNC is the temporal synchronization of the stream of pixels FP as a function of the processing time induced by the various modules of the architecture. Stated otherwise, the synchronization module SYNC introduces one or more delays, via for example delay lines, buffers or any other equivalent implementation, to the incoming stream of pixels. The delay applied may be different for the stream of pixels transmitted to the module for detecting and characterizing points of interest DPI and for the stream of pixels transmitted to a neighborhood memory MV.

The possible delays applied, if any, are determined as a function of the a priori knowledge of the processing times induced by each module of the device 100,101 according to the invention. The delays determined are valid for a given application and for a given parametrization of the architecture.

The aim sought by the introduction of the synchronization module SYNC is to allow synchronization between the stream of pixels feeding the neighborhood memory MV and the calculations carried out on the basis of the pixels contained in this neighborhood memory. This functionality will be further explained in the subsequent description of the modules of the device 100,101 according to the invention.

The synchronized stream of pixels is thereafter transmitted to a module DPI for detecting and characterizing points of interest PI, the function of which is the detection, within an image, of points of interest and their characterization by their position in the image and by at least one detection score. The module DPI executes for this purpose any one of the algorithms for detecting and characterizing points of interests known in the field, among which the algorithms previously cited SURF, SIFT or else a Harris detection algorithm. Any other algorithm allowing the detection and the characterization of points of interests or noteworthy points in an image can be executed by the module DPI. The characterization of the points of interest can also include one or more other characterization parameters (typically the orientation and the scale factor).

Hereinafter, when mention is made of the transmission or the reception, by a module, of points of interest, the reader will understand that this refers to the transmission or the reception of the coordinates of the points of interest in the image as well as information making it possible to characterize them, this information comprising at the minimum a detection score.

The points of interest PI detected and characterized by their position in the image and their detection score are thereafter provided, in pace with the reception of the image pixels, possibly delayed by the synchronization module SYNC, to a module SIPI for selecting and indexing points of interest. The module SIPI for selecting points of interest receives the list of the points of interest PI detected in an image and the function of which is the selection, in a speculative manner, and the indexation of a subset of points of interest. This module SIPI is parametrized by a parameter Selec which specifies the type of selection method used, this type being able to be plural.

The following module GIPI receives the points of interest selected $PI_s$ with their unique index determined by the module SIPI. This module GIPI is on the one hand in charge of communicating with one or more units for calculating descriptors $UCD_0, \ldots UCD_n$ which are in charge of the calculation of descriptors for all the points of interest selected in a speculative manner. Moreover, the function of the module GIPI is also to generate an address for each descriptor calculated with a view to its storage in a points of interest/descriptors strip memory MB1.

The units for calculating descriptors $UCD_0, \ldots UCD_n$ are interfaced with one or more neighborhood memory/memories MV whose content corresponds to a neighborhood of the point of interest of which it is sought to calculate a descriptor. A neighborhood memory MV is fed by the synchronization module SYNC so as to allow permanent synchronization of the content of the neighborhood memory MV with the calculation of descriptor of the current point of interest.

The algorithm implemented by the units for calculating descriptors $UCD_0, \ldots UCD_n$ can be any algorithm for point of interest descriptor calculation, for example the SURF or SIFT algorithm.

In the second embodiment, the device 101 according to the invention also comprises a pairing module MA connected to at least two strip memories MBG1,MBG2 associated with two distinct images. The strip memories MBG1, MBG2 contain information associated with the points of interest and with their descriptors within a strip of an image. Accordingly, and as will be explained hereinafter, an image is decomposed into several horizontal strips. The strip memories $MBG_1,MBG_2$ contain the points of interest described for a strip of the image.

The pairing module MA is connected to a pairing calculation module CA which carries out a pairing score calculation to identify, in the two images, the points of interest which are closest together. Here again, the algorithm used to calculate a pairing score can be any algorithm known in the field (for example a minimum distance according to the L1 norm on the descriptors).

The pairing module MA is parametrized by a spatial filtering parameter and its role is to manage read-access and write-access, for the calculation module CA, to the various strip memories used.

Figure 1:
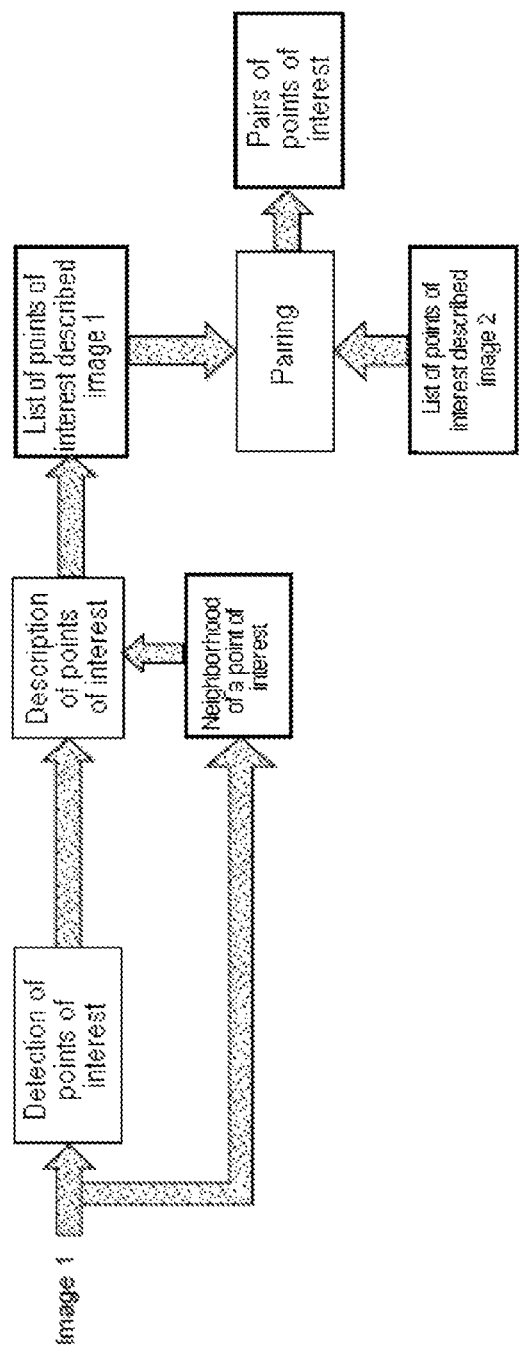
FIG. 1, a functional diagram of a device, according to the prior art, implementing functions for detecting, describing and pairing points of interest, FIG. 2, a schematic of the architecture of a calculation device according to the invention.

The two images used for the calculation of the pairing scores can be two images belonging to the same stream of images, for example an image received at an instant t and an image received at an instant t+1 or t+k with k an integer greater than 1. The two images can also originate from two distinct streams, for example two streams corresponding to different viewpoints of the same scene. In this second case, the architecture described in FIG. 1 is duplicated for each image with the exception of the pairing module MA which is common to the two processing chains for the two images.

The various calculation modules and memories used by the invention will be detailed hereinafter. The general principle of the invention consists in processing the image received strip-wise by performing a selection of the points of interest and a calculation of the descriptors according to a speculative approach which makes it possible to accelerate the stringing together of the calculations and to minimize the storage needs in the global chain for processing an image.

FIG. 2b is schematically represents an image I, belonging to an image stream FP. The image I can be decomposed into strips B comprising all the pixels of one or more consecutive lines of the image I. Each strip B may or may not be decomposed into several same-size selection areas Z. The decomposition of the image I illustrated in FIG. 2bis constitutes a cross-grid which is used by the invention, such as will be explained hereinafter, to accelerate the processings carried out on the image I with a view to carrying out a pairing of points of interest.

Figure 3A:
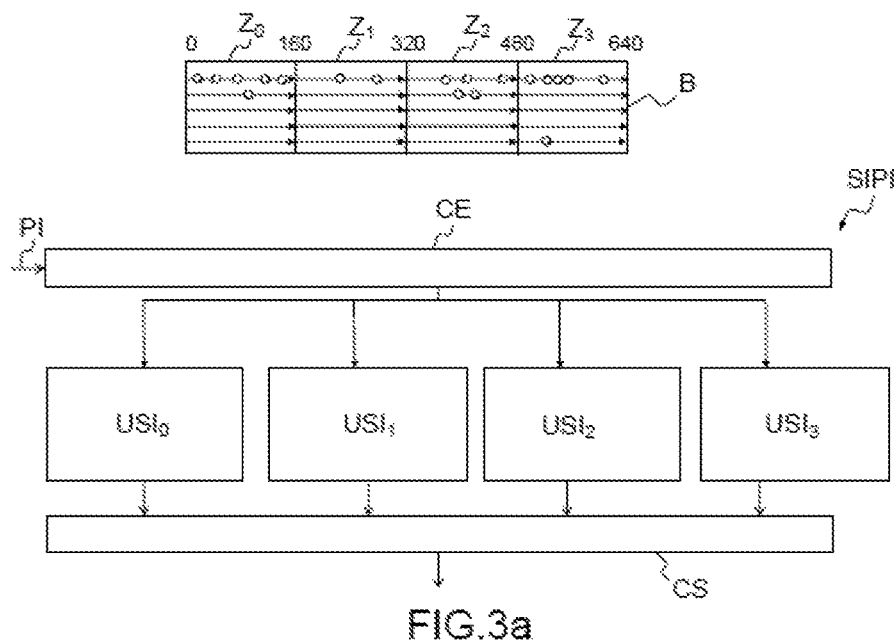
Figure 3B:
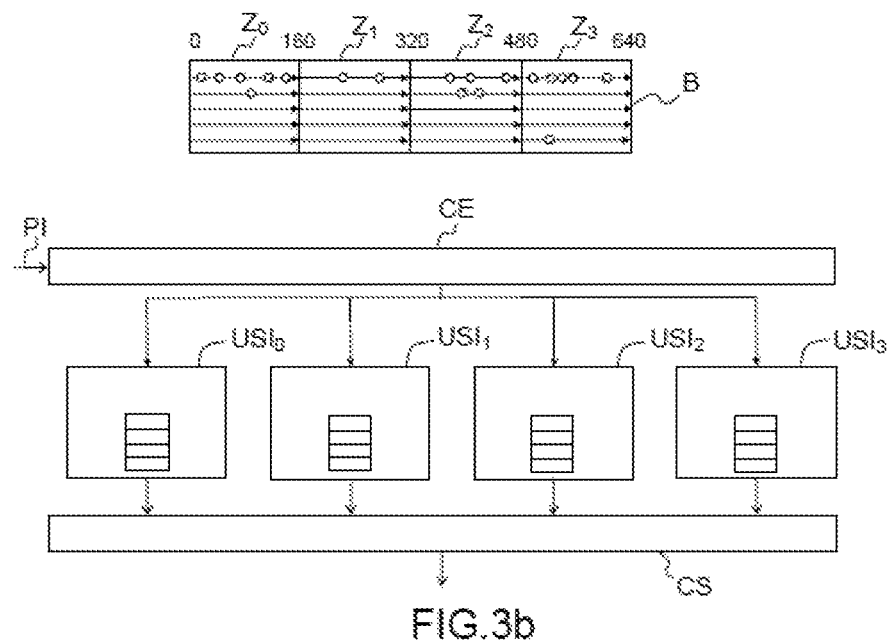
Figure 3C:
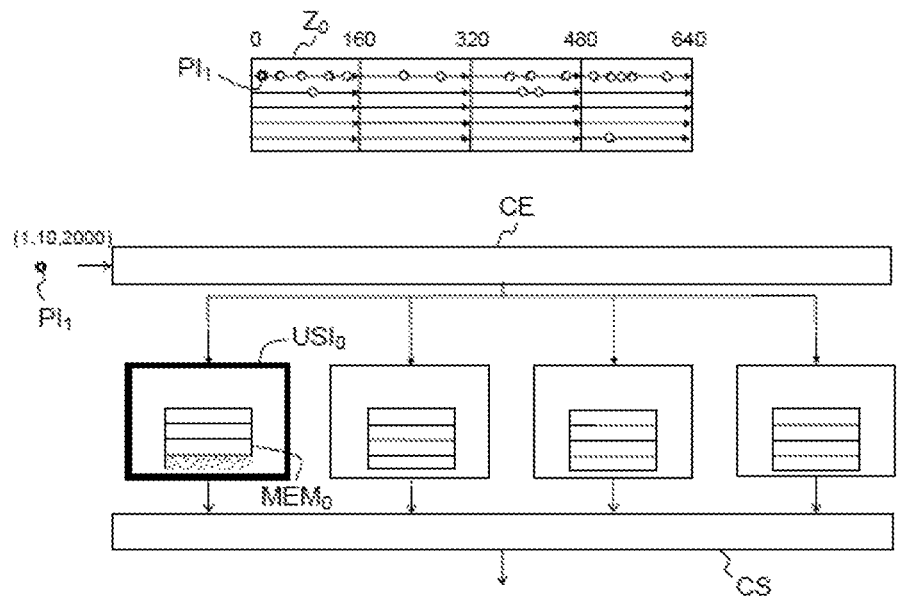
Figure 3D:
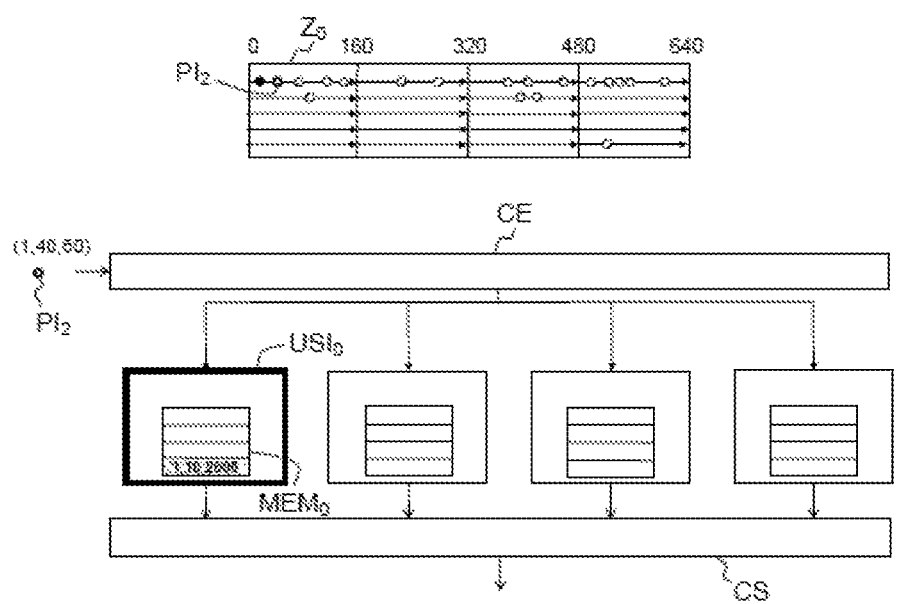
Figure 3E:
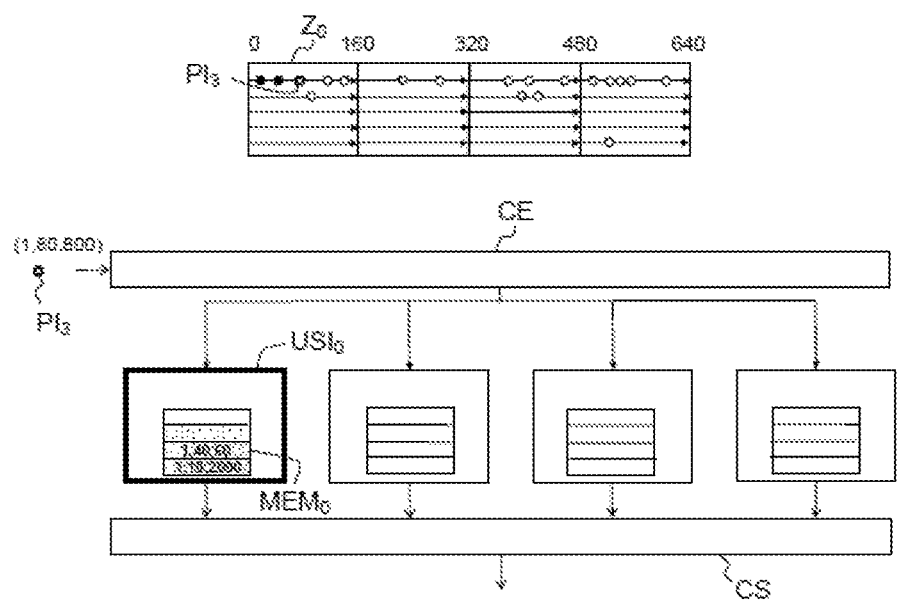
Figure 3F:
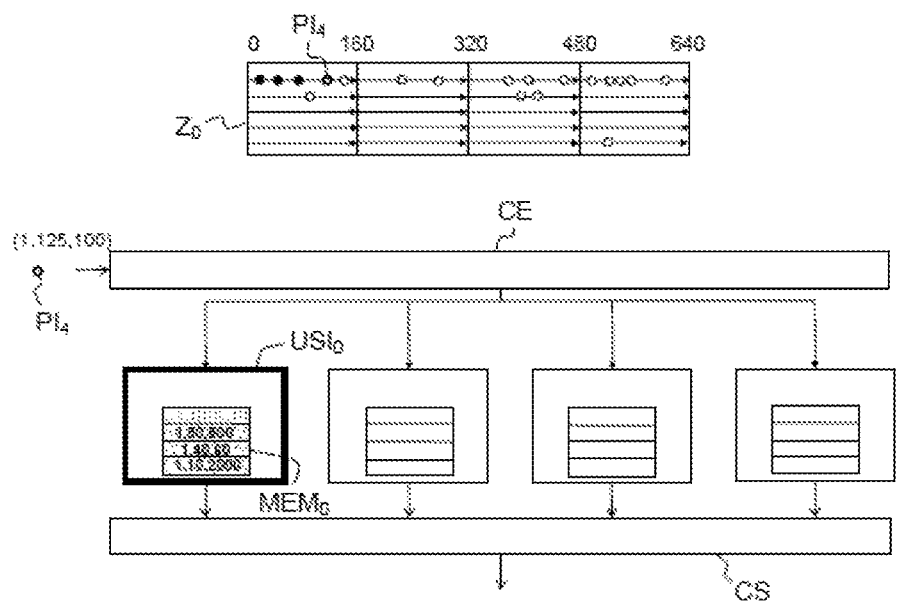
Figure 3G:
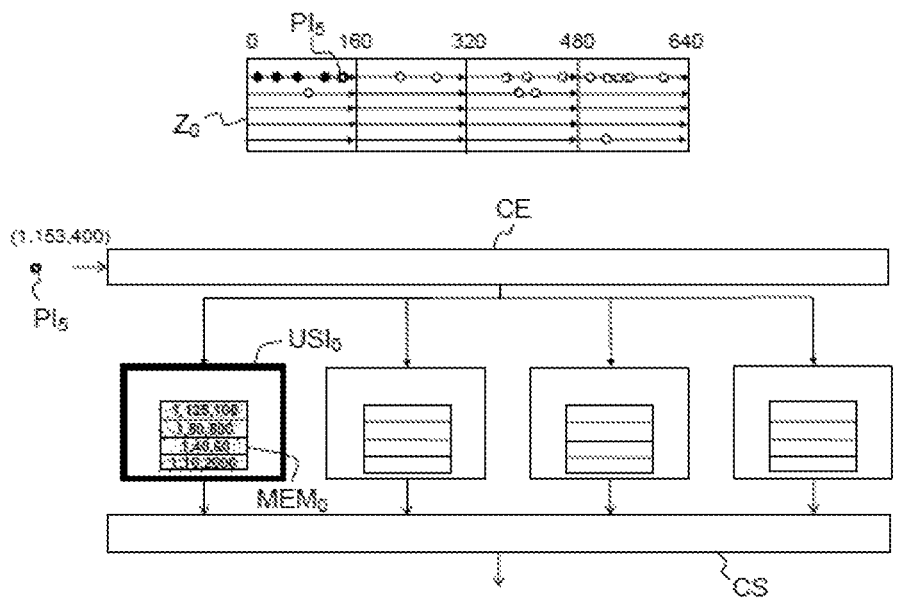
Figure 3H:
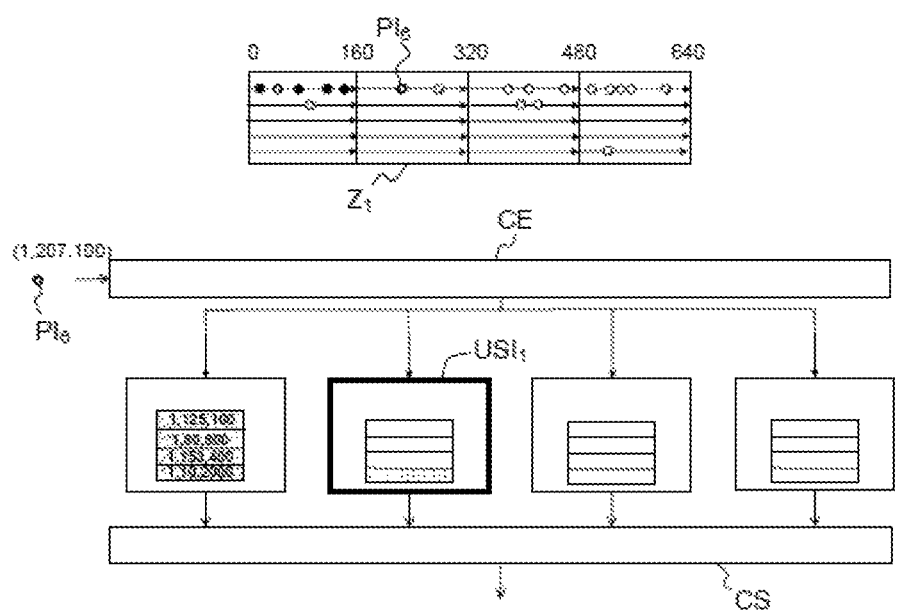
Figure 3I:
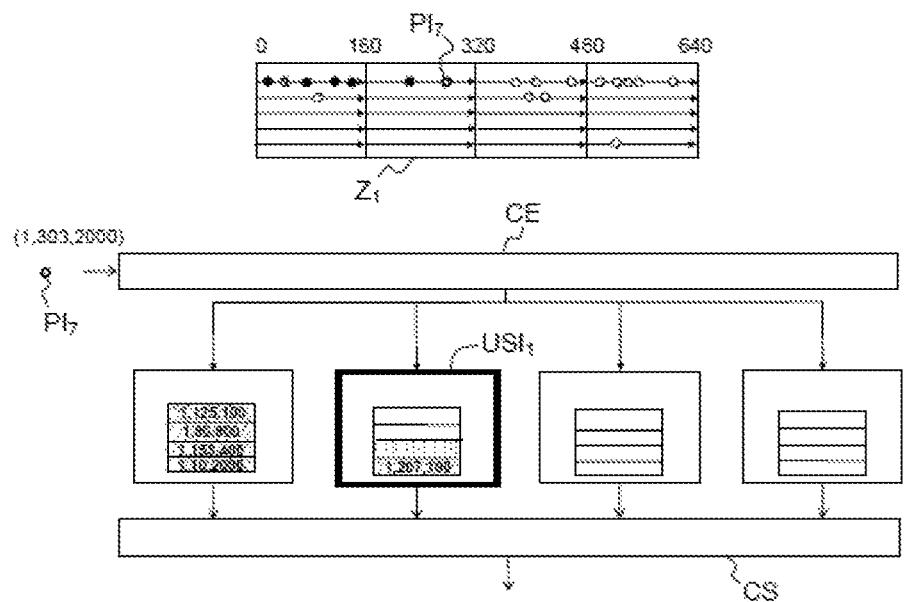
Figure 3J:
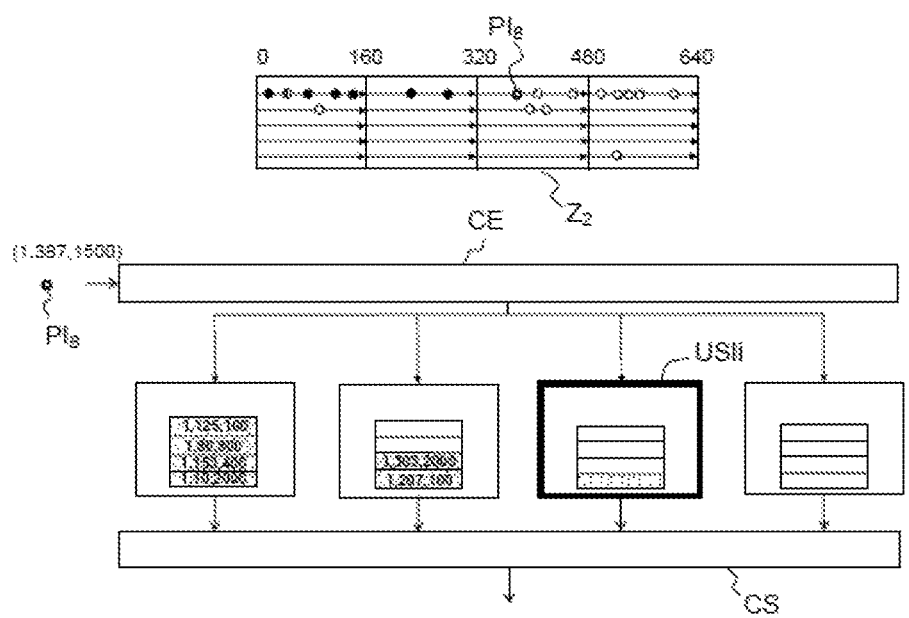
Figure 3K:
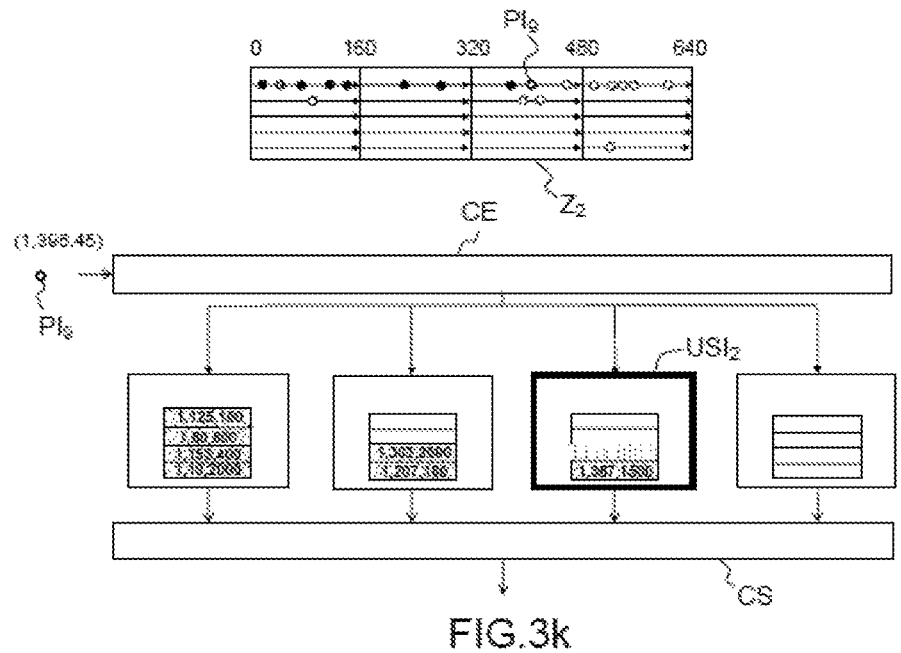
Figure 3L:
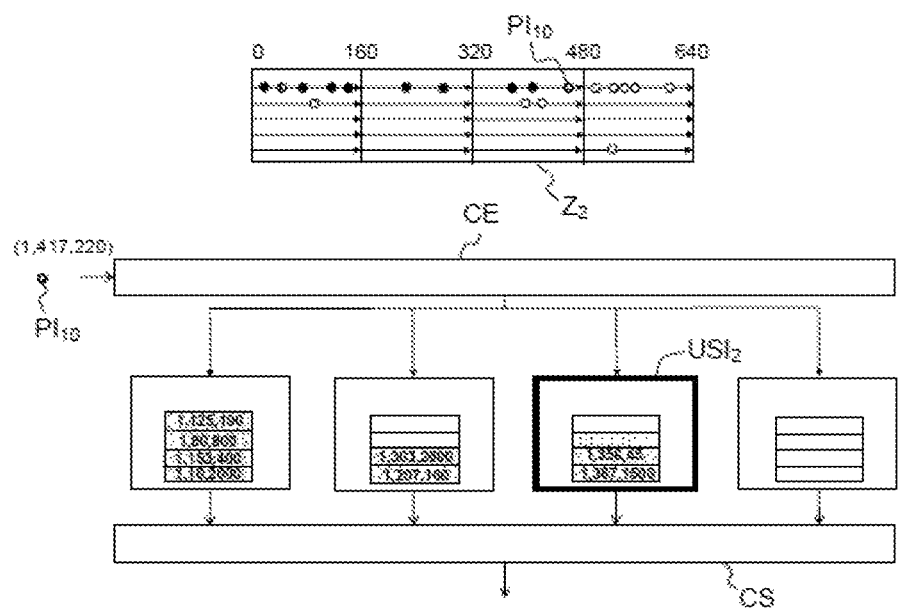
Figure 3M:
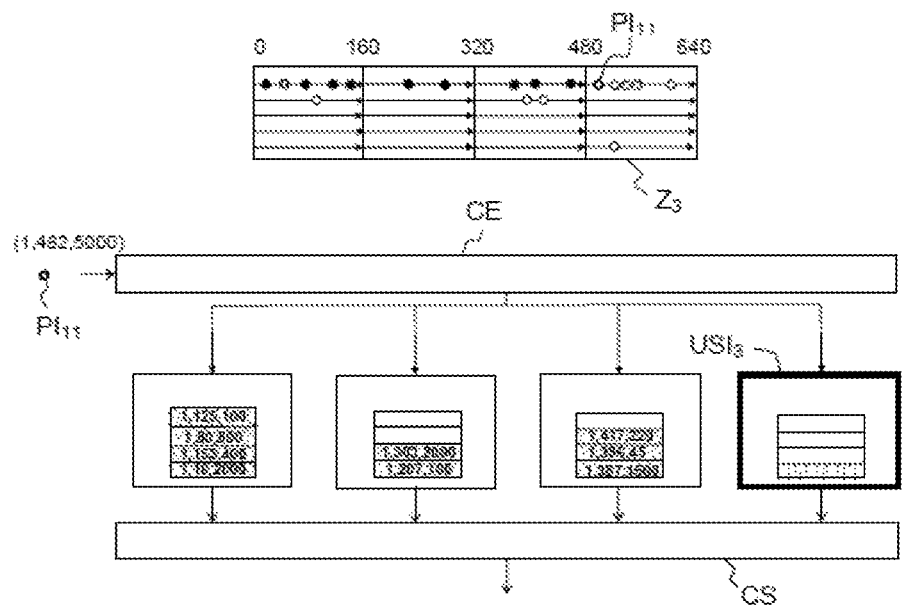
Figure 3N:
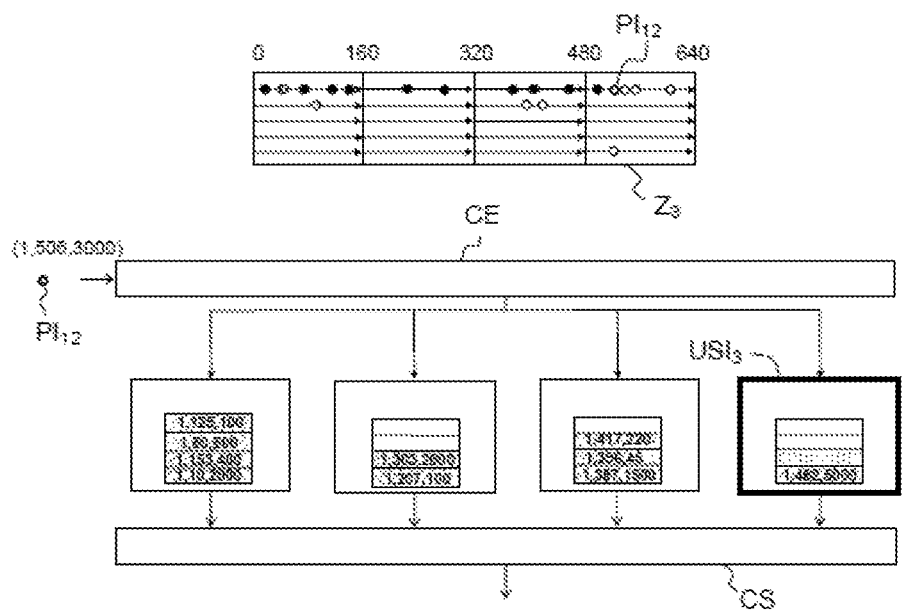
Figure 3O:
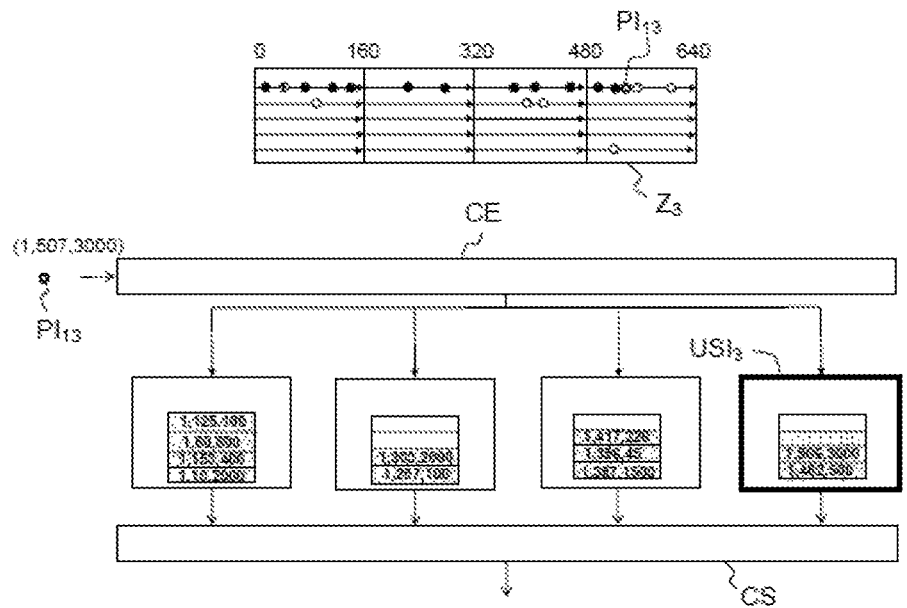
Figure 3P:
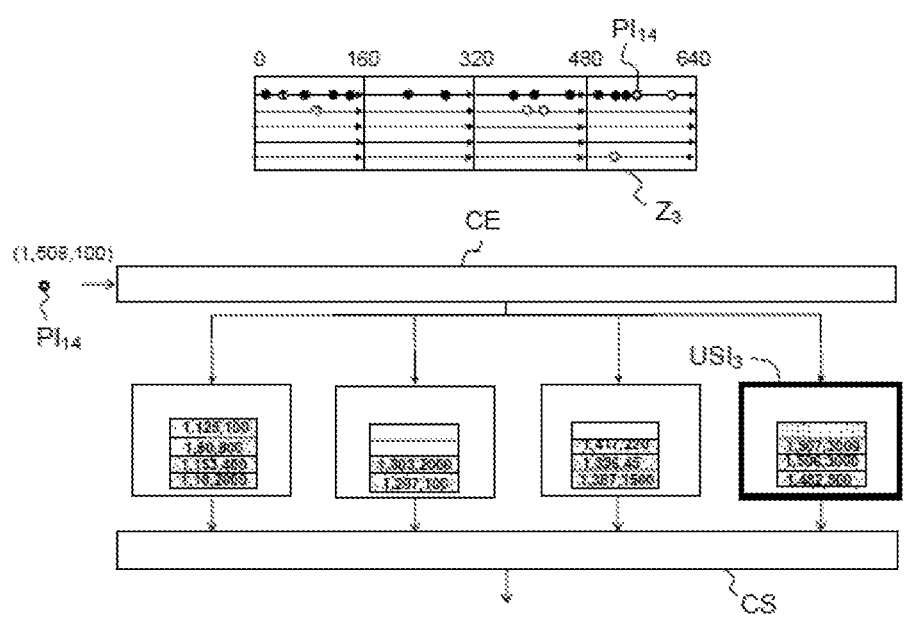
Figure 3Q:
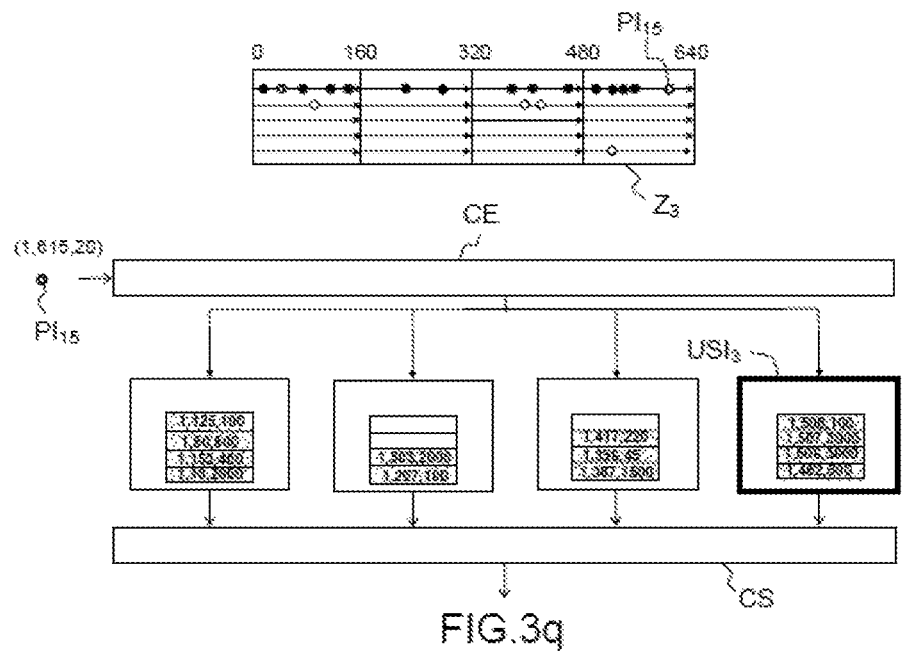
Figure 3R:
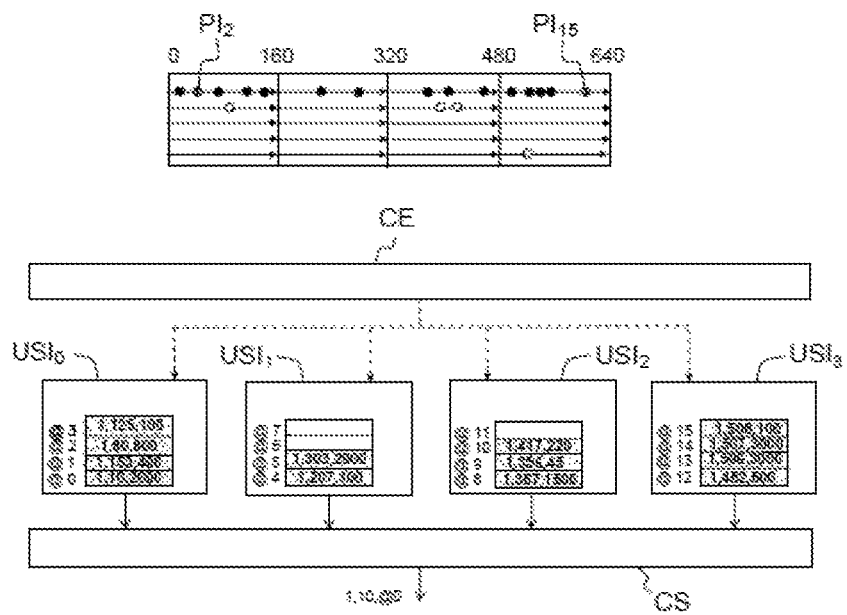
Figure 3S:
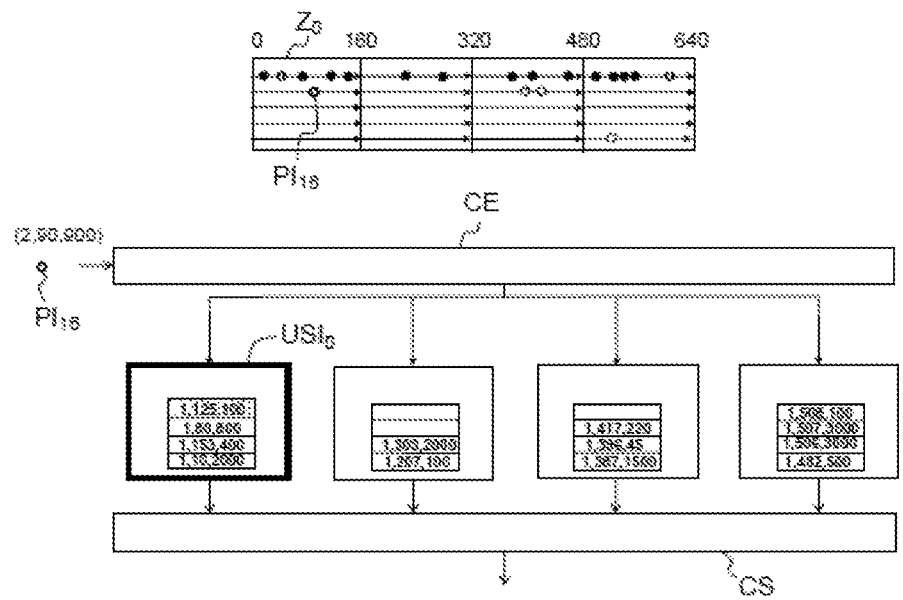
Figure 3T:
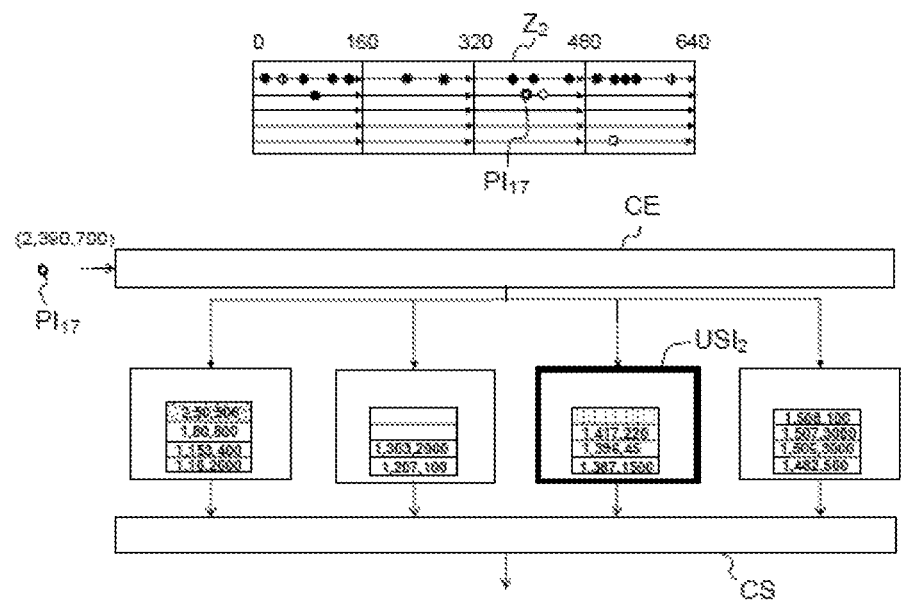
Figure 3U:
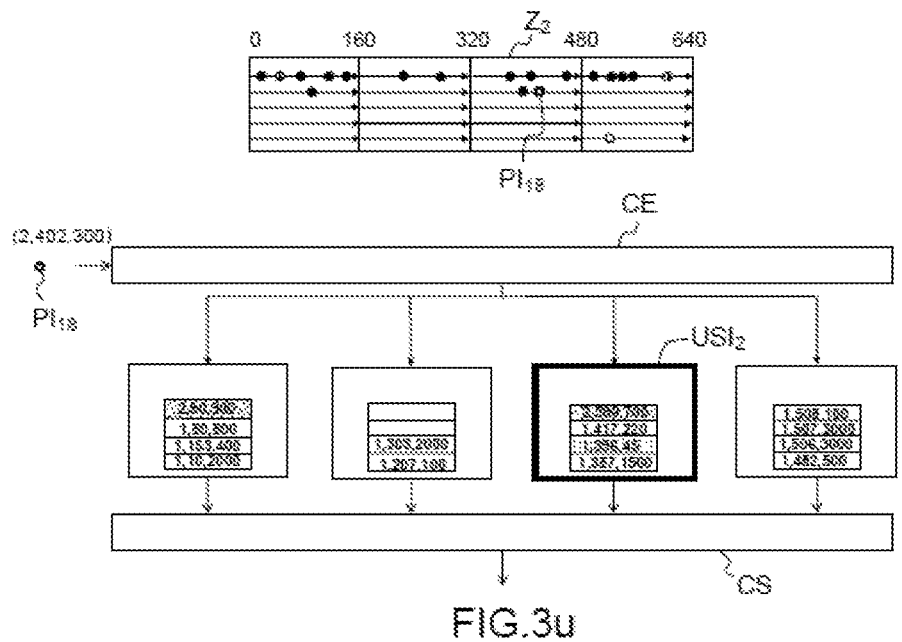
Figure 3V:
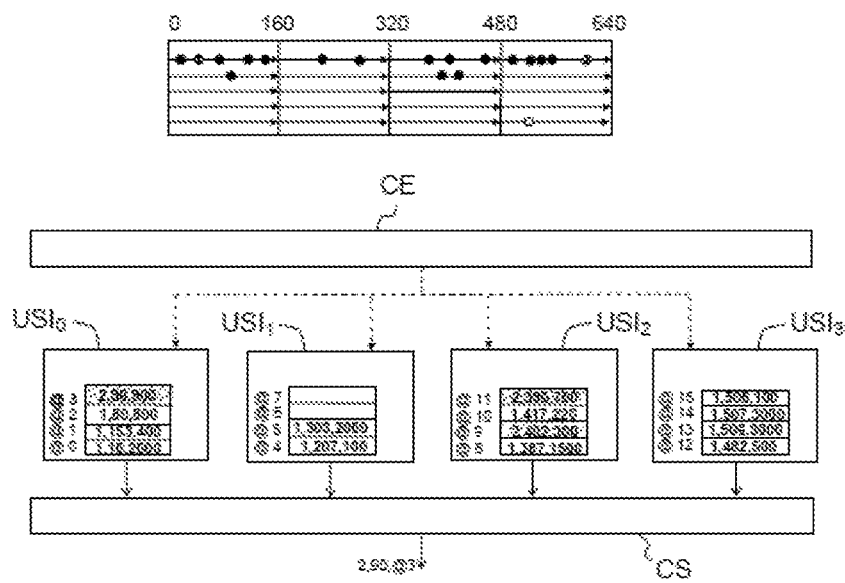
Figure 3W:
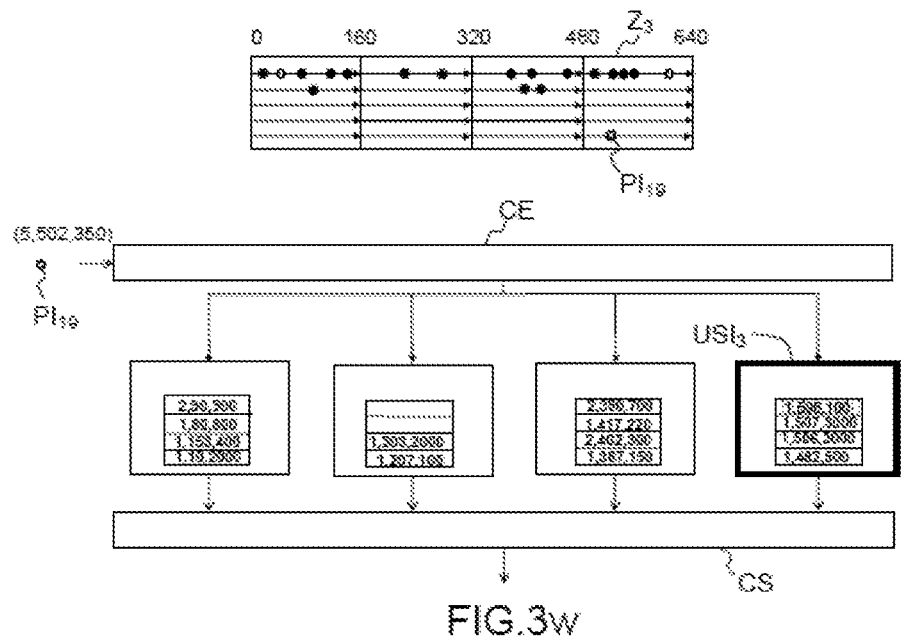
Figure 3X:
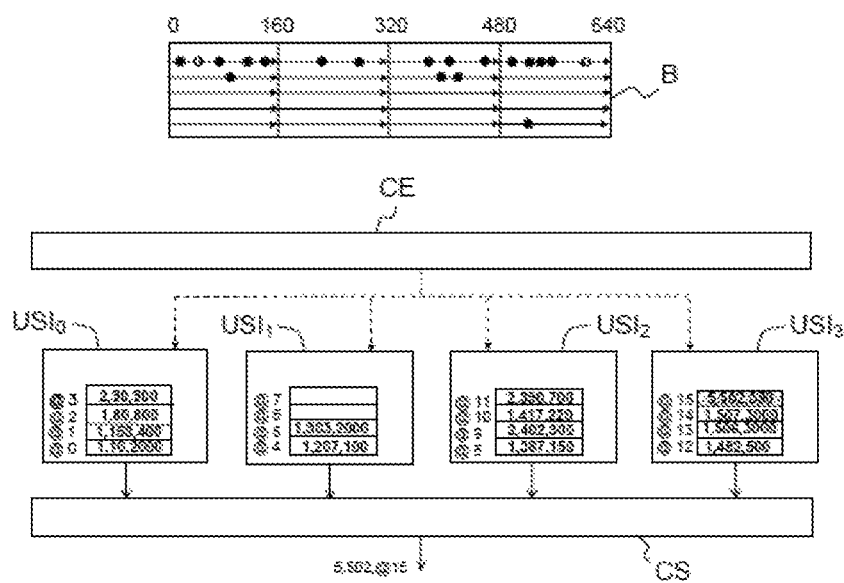

The detailed operation of the first module SIPI for selecting and indexing points of interest according to the invention is now described with the support of FIGS. 3a-3x.

FIG. 3a describes an exemplary embodiment of the module SIPI for selecting and indexing points of interest which mainly comprises an input controller CE, an output controller CS and several units for selecting and indexing points of interest $USI_0$, $USI_1$, $USI_2$, $USI_3$. Each selection and indexation unit $USI_0$, $USI_1$, $USI_2$, $USI_3$ comprises at least one memory or register for saving at least P points of interest as well as a control unit for implementing a method for selecting points of interest. In the top part of FIG. 3a is schematically illustrated a strip B comprising several lines of an image I to be processed comprising 640 columns. The strip B is furthermore decomposed into four selection areas $Z_0,Z_1,Z_2,Z_3$ each comprising 160 columns. The first module SIPI for selecting and indexing points of interest is configured to select at most an identical number of points of interest P for each selection area of a strip. In the example of FIG. 3a, P is equal to four. The example described is not limiting, in particular the number of selection areas in a strip may be different. The selection areas may or may not be of identical sizes. In particular, the number of columns of an image is not necessarily equal to a multiple of the number of selection areas. The number of selection areas in a strip determines the number of selection and indexation units, given that there is one unit per selection area.

The module SIPI according to the invention is thus parametrized on the one hand by the number of selection and indexation units that it contains in conjunction with the number of selection areas per strip and on the other hand by the number P of points of interest selected at most per selection area. These two parameters are determined as a function of the constraints of the envisaged application. As will be explained hereinafter, the number P of points of interest selected per selection area as well as the number of selection areas per strip has an influence on the final performance of the pairing function and on the global execution performance of the system, in particular the latency.

FIGS. 3b to 3x illustrate for this exemplary embodiment, step by step, the manner of operation of the module for selecting and indexing points of interest SIPI according to the invention for a nonlimiting example of points of interest detected received by this module and identified in the strip B by their position in the image.

The manner of operation is described for a strip B of an image I and is identical for each strip of an image, the strips being traversed in the order of arrival of the corresponding pixels of the image.

Furthermore, FIGS. 3b to 3x describe an exemplary embodiment using a particular method for selecting points of interest. This particular method consists in selecting, in each selection area, the P points of interest exhibiting the highest detection score. The invention is not limited to the selection method described and can be widened to any type of selection method making it possible to select a reduced number P of points of interest within a selection area comprising a number greater than P of points of interest, the selection criterion being able to differ and consisting of a parameter of the module SIPI. In particular the selection method can consist in selecting on the contrary the P points of interest exhibiting the lowest detection score. It can also consist in selecting the P points of interest according to a random criterion or in a chronological order. The examples described are not limiting and any selection of P points of interest from among a distribution of a larger number of points and according to a predetermined criterion is compatible with the invention.

FIG. 3b illustrates the reception by the input controller CE of a point of interest PI previously detected and characterized by the detection device DPI. Specifically, the input controller CE receives at least the coordinates of the point of interest in the image as well as its detection score. The detection score is a numerical value that can vary in a given range of variation which depends on the detection algorithm used. The detection score is proportional to the probability that a pixel of the image corresponds to a point of interest. The detection score corresponds for example, to a degree of saliency. Comparison of the detection score with a detection threshold makes it possible to discriminate the points of interest from among the whole set of pixels of the image. Recall that the points of interest are noteworthy points of the image which recur from image to image within a temporal sequence. Identification of these points allows, for example, object tracking in a sequence of images.

The points of interest are received by the input controller in their order of appearance in an image strip B traversed line by line. In the example of FIG. 3b, the strip B comprises five lines on which lie 19 points of interest (15 on the first line, 3 on the second line and 1 on the fifth line).

FIGS. 3c to 3q illustrate the successive reception of the 15 points of interest corresponding to pixels of the first line of the strip B.

In FIG. 3c, the first point of interest $PI_1$ is on the one hand represented in the strip B and in the selection area $Z_0$ by its position and on the other hand by the triplet $\{1,10,2000\}$ which corresponds to its coordinates in the image ($1^{st}$ line, $10^{th}$ column) and its detection score (2000). The first point of interest is identified (by its coordinates) as belonging to the first selection area $Z_0$ of the strip B. It is transmitted to the selection unit $USI_0$ associated with the first selection area $Z_0$ so as to be saved in its local memory $MEM_0$.

FIGS. 3d, 3e and 3f show the reception of the points of interest $PI_2, PI_3, PI_4$ also situated in the first selection area $Z_0$ of the strip B and their placement in the memory $MEM_0$ of the first selection unit $USI_0$.

FIG. 3g illustrates a typical case in which a fifth point of interest $PI_5$ belonging to the same selection area $Z_0$ is received whilst the maximum number of points of interest saved per selection unit is equal to four. In this case, and according to a particular method for selecting points of interest, the selection unit $USI_0$ effects a comparison between the detection score of the fifth point of interest $PI_5$ and the detection scores of the points of interest already saved in memory. As explained hereinabove, an exemplary selection rule can consist in selecting the P points of interest having the highest detection scores. The rule implemented by a selection unit $USI_0$, $USI_1$, $USI_2$, $USI_3$ is then the following. If the detection score of the new point of interest received is greater than the detection score of at least one of the points of interest saved in the local memory, then the saved point of interest which possesses the smallest detection score is replaced with the new point of interest received. In the converse case, the new point of interest received is not saved and is therefore eliminated from the selected points of interest. The temporarily selected points of interest are called candidate points of interest. They may be different from the points of interest selected ultimately on completion of the processing of a whole selection area and called retained points of interest.

Thus, in FIG. 3h it is seen that the point of interest $\{1,40,60\}$ has been replaced in the memory $MEM_0$ by the point of interest $\{1,153,400\}$.

The mechanism for filling the local memories of the selection and indexation units $USI_0$, $USI_1$, $USI_2$, $USI_3$ continues in the manner illustrated in FIGS. 3h to 3q until the end of the processing of the first line of the strip B.

FIG. 3r shows the manner of operation of the selection and indexation device SIPI at the end of the processing of a line of an image strip. On completion of the previously described processings, out of the 15 points of interest included in the first line of the strip B, two points of interest $PI_2$ and $PI_{15}$ have not been selected and 13 candidate points of interest have been saved. The latter are then extracted from the memories of each selection unit by the output controller with a unique index lying between 0 and P−1 and are then transmitted to the descriptors calculation module CD. Thus a point of interest is fully identified in a strip by this index and the number of the selection area.

In the example illustrated, the transmission of the selected points of interest to the following module is done at the end of the processing of each new line. More generally, this transmission can be performed at the end of the processing of K lines, with K a parameter equal to an integer number greater than or equal to 1 and strictly less than the number of lines per strip.

In FIG. 3r, the indices @0 to @15 are represented on the left of the memory locations where the candidate points of interest in each selection and indexation unit are stored.

These indices constitute an essential characteristic of the invention since they make it possible to perform a speculative selection of the points of interest. Indeed, at the end of the processing of one or K lines, the candidate points of interest are transmitted to the following module in the processing chain even though the selection area has not been fully traversed.

Thus, the candidate points of interest constitute intermediate information that may be reassessed at each new transmission. The index generated by the module SIPI for each candidate point of interest is unique and makes it possible to inform the following module GIPI in the processing chain of the validity of a candidate point of interest. More specifically, a candidate point of interest replaces another candidate point of interest previously transmitted to the module GIPI if it belongs to the same selection area and has the same index.

The advantage of using a speculative approach is to allow anticipation of the processings since data are transmitted to the following module before the whole set of points of interest of an image is processed. This approach differs from the customary techniques which consist in making each module process the whole set of points of interest of an image. The anticipation of the processings which is induced by the speculative approach advantageously makes it possible to minimize the memory requirement needed for the calculation of the descriptors.

When an entire strip is processed, the list of candidate points of interest is reset to zero in the memories of the selection and indexation units $USI_0$, $USI_1$, $USI_2$, $USI_3$.

The dispatching of the new points of interest selected every K lines makes it possible to describe as early as possible the best candidate points of interest while not calculating all the possible candidates. The speculative aspect of the architecture makes it possible to guarantee a beneficial compromise between processing latency, storage requirement and efficiency. The use of a unique index makes it possible to sort the points of interest without needing to save all the points of interest detected in an image. It also makes it possible to avoid the wait of sorting all the points of interest of a selection area before dispatching information to the following module.

FIGS. $3s,3t,3u$ illustrate the processing of the second line of the strip B which contains three points of interest $PI_{16}$, $PI_{17}$, $PI_{18}$. The point of interest $PI_{16}$ is selected and replaces a candidate point of interest previously selected from the $1^{st}$ line of the first selection area $Z_0$ (FIG. $3s$). The point of interest $PI_7$ is selected and saved in the still free memory location of the third selection unit $USI_2$ (FIG. $3t$). The point of interest $PI_{18}$ is selected and replaces a point of interest previously selected from the 1st line of the third selection area $Z_2$ (FIG. $3u$).

At the end of the processing of the second line (FIG. $3v$), only the new candidate points of interest are transmitted to the management module GIPI in charge of the calculation of the descriptors. In the case of FIG. $3v$, the three candidate points of interest associated with the indices @3, @9 and @11 are transmitted.

FIG. $3w$ shows the processing of the last line of the strip B which comprises a single point of interest $PI_{19}$ situated in the last selection area $Z_3$ and which is saved in the memory of the selection unit $USI_3$ on account of its higher detection score than one of the points of interest present in memory.

Lastly, FIG. $3x$ illustrates the transmission of the new candidate point of interest, with its index @15, on completion of the processing of the last line of the strip B. The points of interest selected by the selection and indexation units illustrated in FIG. $3x$ are the points of interest finally retained for each selection area.

The module for selecting and indexing points of interest SIPI according to the invention makes it possible to reduce the number of points of interest to be processed with a view to the calculation of the descriptors (which is complex) by carrying out selection by strips and by areas in a speculative manner. Thus, a compromise is found (which can be refined by adjusting the parameters of the module SIPI) between the speediness of execution and of transmission of the data to the following module on the one hand and the maintaining of a good level of detection performance on the other hand.

The manner of operation of the module GIPI for calculating descriptors of points of interest according to the invention is described now with the support of FIGS. $4a$-$4g$.

FIG. $4a$ schematically represents the main elements of the module GIPI in charge of managing the calculation of descriptors according to the invention. This module mainly comprises an input controller CE responsible for the reception of the data originating from the module SIPI for selecting and indexing points of interest and for the transmission to one or more queues $FIFO_0$, $FIFO_1$. The module GIPI also comprises one or more descriptor control modules $CD_0$, $CD_1$ each associated with a queue $FIFO_0$, $FIFO_1$ and each of which cooperates with a descriptor calculation unit $UCD_0$, $UCD_1$ and a neighborhood memory $MV_0$, $MV_1$. The module GIPI also comprises an addressing management unit GA as well as a unit for recovering the descriptors URD in charge of transferring the calculated descriptors to a strip memory MB at the address provided by the addressing management unit GA.

Each descriptor calculation unit $UCD_0$, $UCD_1$ is in charge of the calculation of descriptors for the points of interest situated in a calculation area of the image strip B. For the example of FIG. $4a$, the image strip B is decomposed into two calculation areas. The number of descriptor calculation areas may be identical to the number of selection areas $Z_0$, $Z_1$, $Z_2$, $Z_3$ of points of interest or may be different. The constraint to be complied with is that each descriptor calculation unit $UCD_0$, $UCD_1$ is associated with one or more points of interest selection areas, stated otherwise with one or more units for selecting points of interest. The number of points of interest selection areas is therefore a multiple of the number of descriptor calculation units. The use of several calculation areas makes it possible to distribute the calculations to be performed over several descriptor calculation units.

Note also that the neighborhood memory may be unique, each descriptor calculation unit having access to a location of this memory or there may be a neighborhood memory per descriptor calculation unit, as represented in FIG. $4a$. A neighborhood memory contains the neighborhoods of all the candidate points of interest undergoing processing by the descriptor calculation unit or units to which it is attached. The neighborhood can have a variable size as a function of the algorithm for calculating descriptors or the parameters of this algorithm. The descriptor calculation units implement any algorithm for calculating a descriptor of a point of interest of an image on the basis of its coordinates, of the parameters generated by the block DPI and of a neighborhood, centered on this point of interest, of the image.

The manner of operation of the module GIPI is described in FIG. $4b$ in combination with FIG. $3r$. FIG. $4b$ represents the operating step, in the example described, where the first 13 points of interest selected on the $1^{st}$ line of the image strip B are transmitted by the output controller of the selection module SIPI to the input controller CE of the module GIPI. The content of the memories of the selection units $USI_0$, $USI_1$, $USI_2$, $USI_3$ is transmitted, via the input controller CE to the queues $FIFO_0$, $FIFO_1$ as a function of the position of the point of interest in the image, stated otherwise, in the example described, as a function of the positioning of the point of interest in one of the two calculation areas considered. The queues contain, at each memory location, at least the coordinates of the point of interest and its index (allotted by the selection unit which selected it). The queues $FIFO_0$, $FIFO_1$ are dimensioned so as to contain the information relating to M points of interest where M is equal to the maximum number P of points of interest selected by points of interest selection areas, multiplied by the number of points of interest selection units associated with a descriptor calculation unit. In the example of FIG. $4b$, the queues can contain $4 \times 2 = 8$ points of interest.

When at least one point of interest is available in a queue $FIFO_0$, the associated control unit for the descriptor calculation $CD_0$ transmits the data contained in the queue $FIFO_0$ and required for the calculation of the descriptor (stated otherwise at least the coordinates of the point of interest) to the descriptor calculation unit $UCD_0$. This unit $UCD_0$ reads the neighborhood associated with the point of interest in the neighborhood memory $MV_0$ and then performs the calculation of the descriptor. This particular calculation is complex and a heavy consumer of calculation time, it typically requires several tens to hundreds of clock cycles. When the calculation has terminated, the control unit for the descriptor calculation $CD_0$ activates an end signal indicating that it is ready to store the calculated descriptor. The content of the neighborhood memory $MV_0$ is updated directly on the basis of the incoming stream of pixels FP possibly delayed by the synchronization module SYNC to ensure synchronization between the content of the neighborhood memory and the descriptor calculation to be performed on the current point of interest. If the candidate points of interest selected are transmitted to the module GIPI after several processing lines and not a single line, then the neighborhood memory must contain a slightly more significant image area which covers the neighborhood areas corresponding to points of interest potentially situated on any one of the processing lines.

At the end of the calculation of a descriptor, the descriptors recovery unit URD receives the result of the calculation, as well as the information relating to the point of interest and transfers all these data into a strip memory MB. On the basis of the unique index of the point of interest, generated by the selection and indexation unit SIPI, and of the identifier of the unit for selecting points of interest from which it originates, an address is allotted to the point of interest described so as to be saved in the strip memory with its associated descriptor. This address is generated by the addressing management module GA.

The processing of the data by image lines thus allows the module GIPI to start the operations for the points of interest selected on the first line while the selection unit SIPI continues the processing of the following lines. Thus, a pipeline mechanism is introduced which makes it possible to accelerate the global processing of the chain.

Figure 4A:
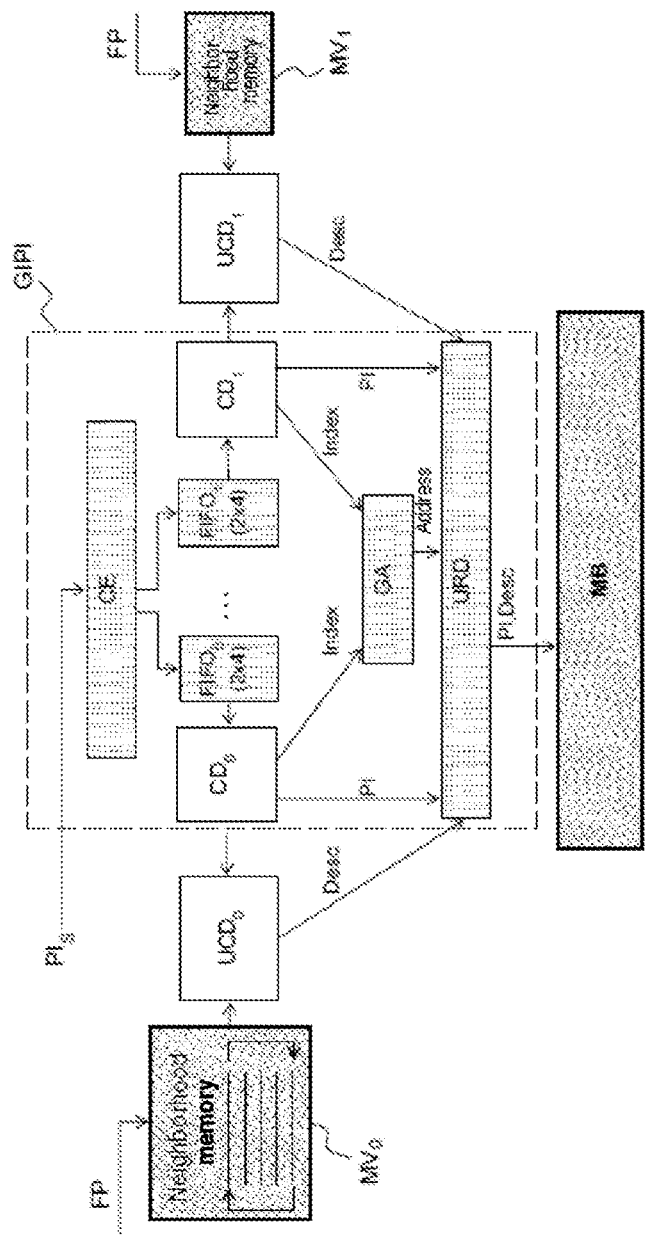
Figure 4B:
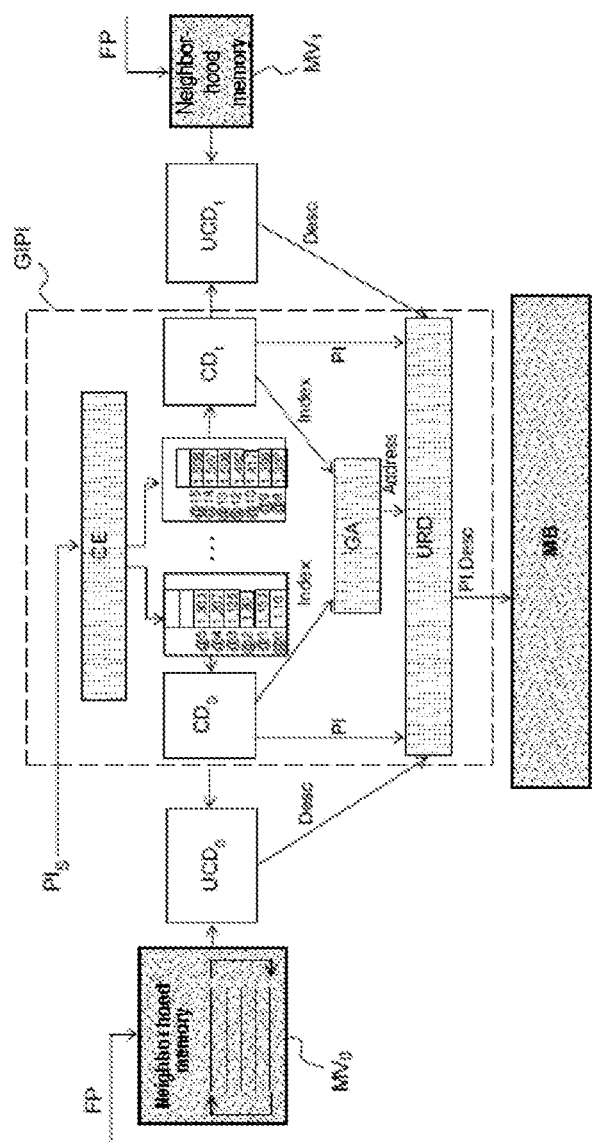
Figure 4C:
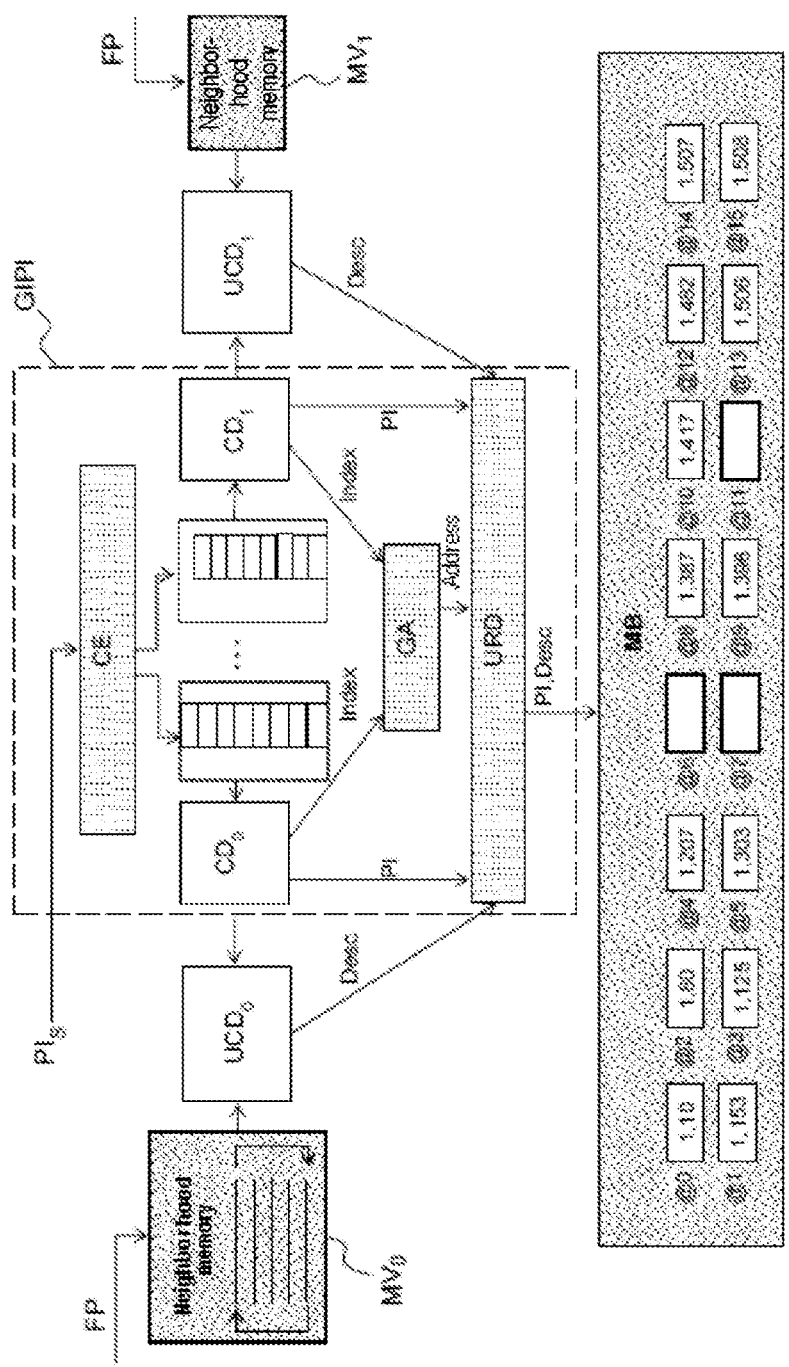

FIG. 4c illustrates the placing into strip memory MB of the descriptors calculated for the selected points of interest on completion of the processing of the $1^{st}$ line of the strip B.

Figure 4D:
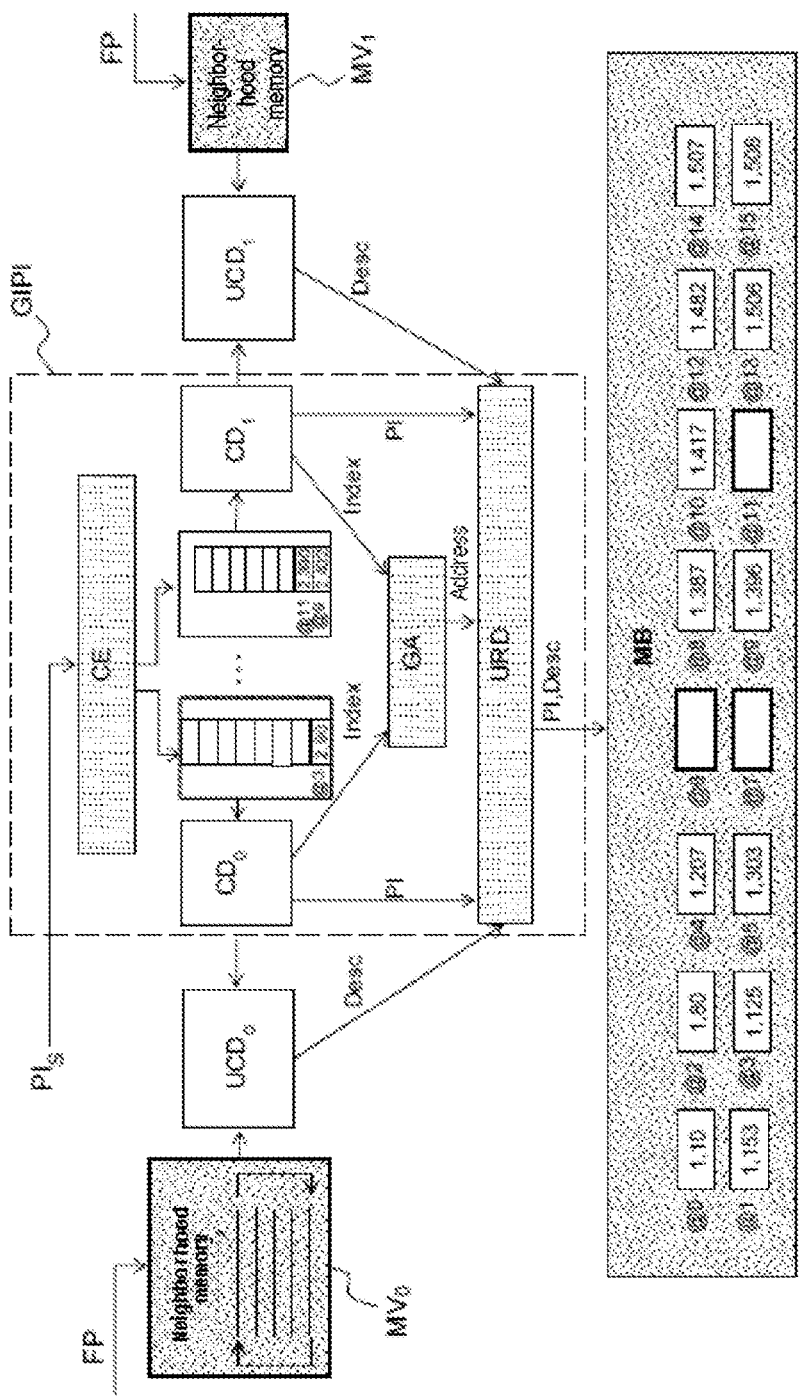

FIG. 4d shows the loading of the queues $FIFO_0, FIFO_1$ with the three new candidate points of interest selected on completion of the processing of the $2^{nd}$ line (cf FIG. 3v). These three points of interest are loaded into the queues with their indices, the calculation of the descriptors is performed thereafter and then the result of the calculation is loaded into the strip memory MB at the address generated on the basis of the unique index of the point of interest (cf FIG. 4d). Thus, the previously described point of interest saved at this location is overwritten. The advantage of this speculative mechanism is anticipation of the processings by "pipeline" operation. This approach allows the parallelization of the calculations of the descriptors so as to comply with the tempo imposed by the image stream and the minimization of the memory size.

Figure 4E:
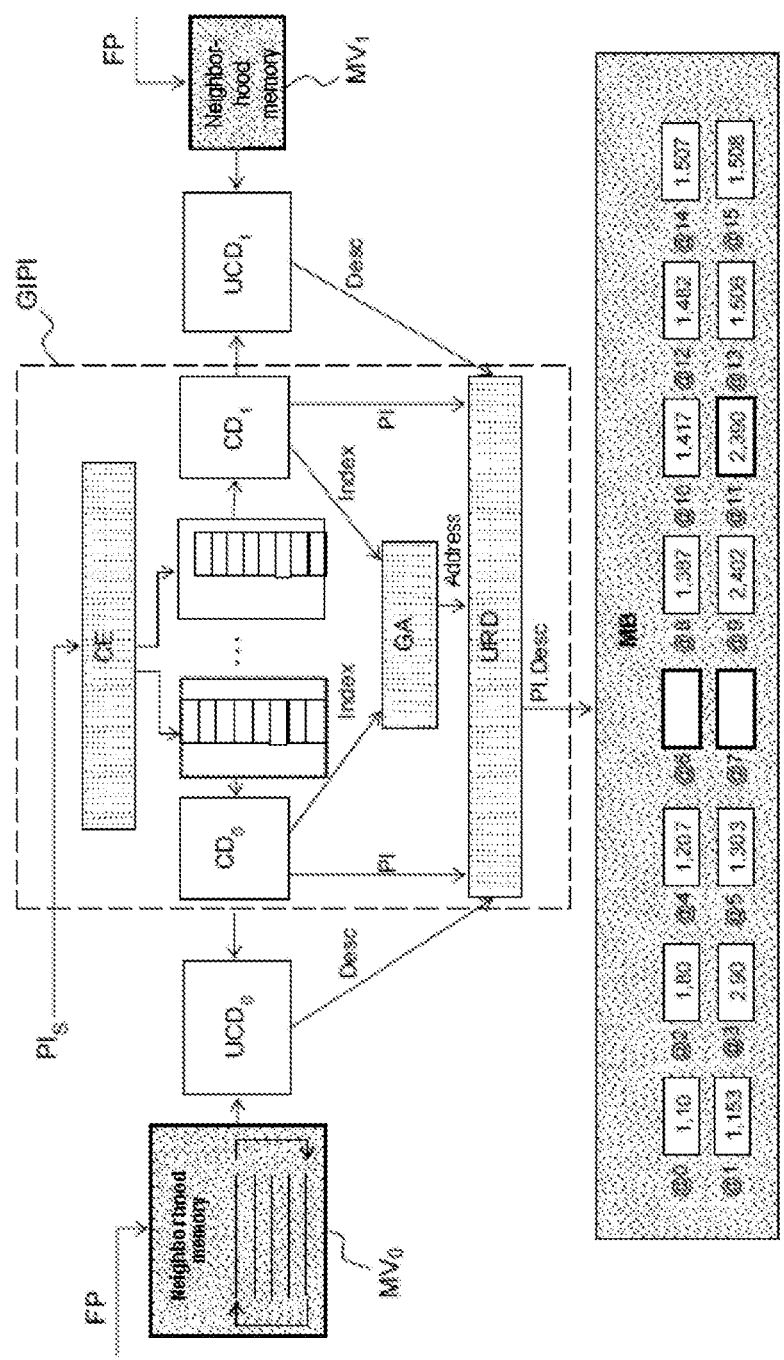

In FIG. 4e, it may be seen that the memory locations associated with the indices @3, @9 and @11 have been modified. Thus, the detected points of interest are calculated as early as possible, limiting the memory footprint due to saving the neighborhoods, as is required for the calculation of the descriptors, even if this calls into question the data calculated during the calculation of the following lines. This is the speculation principle on which the architecture according to the invention is based.

Figure 4F:
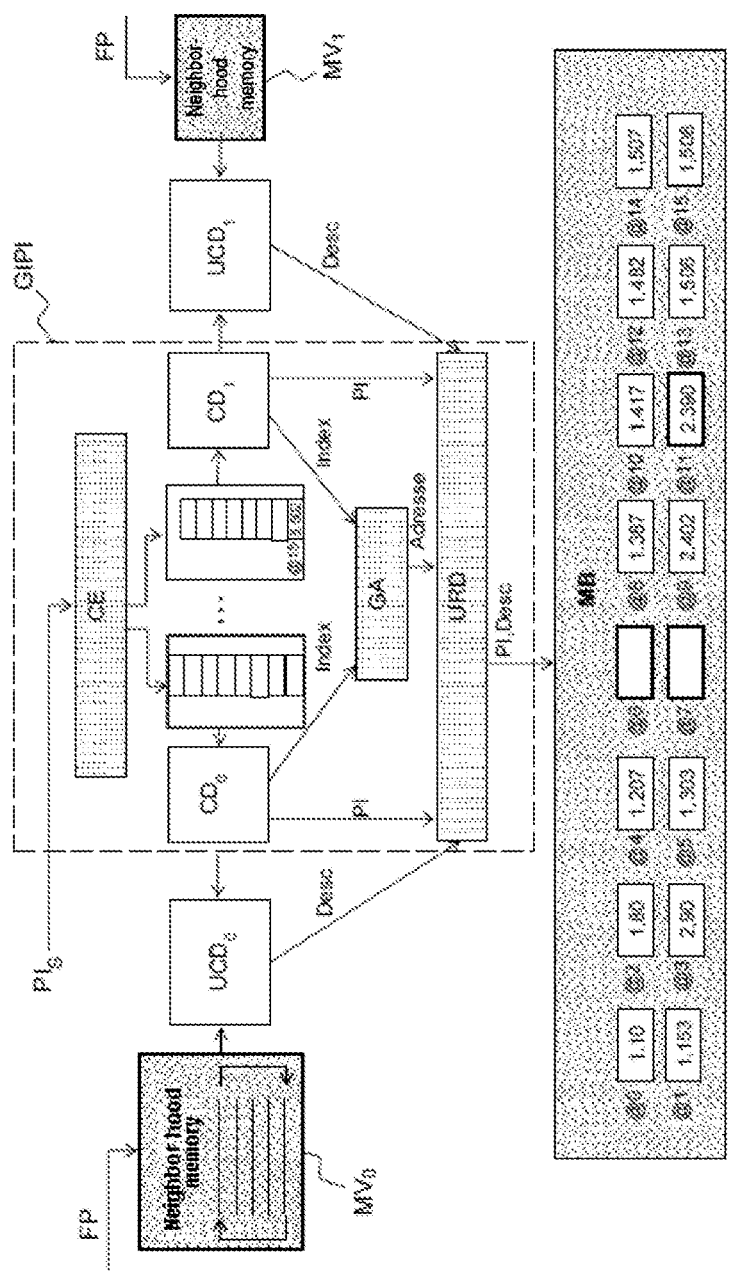

FIG. 4f illustrates the reception of the last point of interest of the strip B and its loading into the queue $FIFO_1$.

Figure 4G:
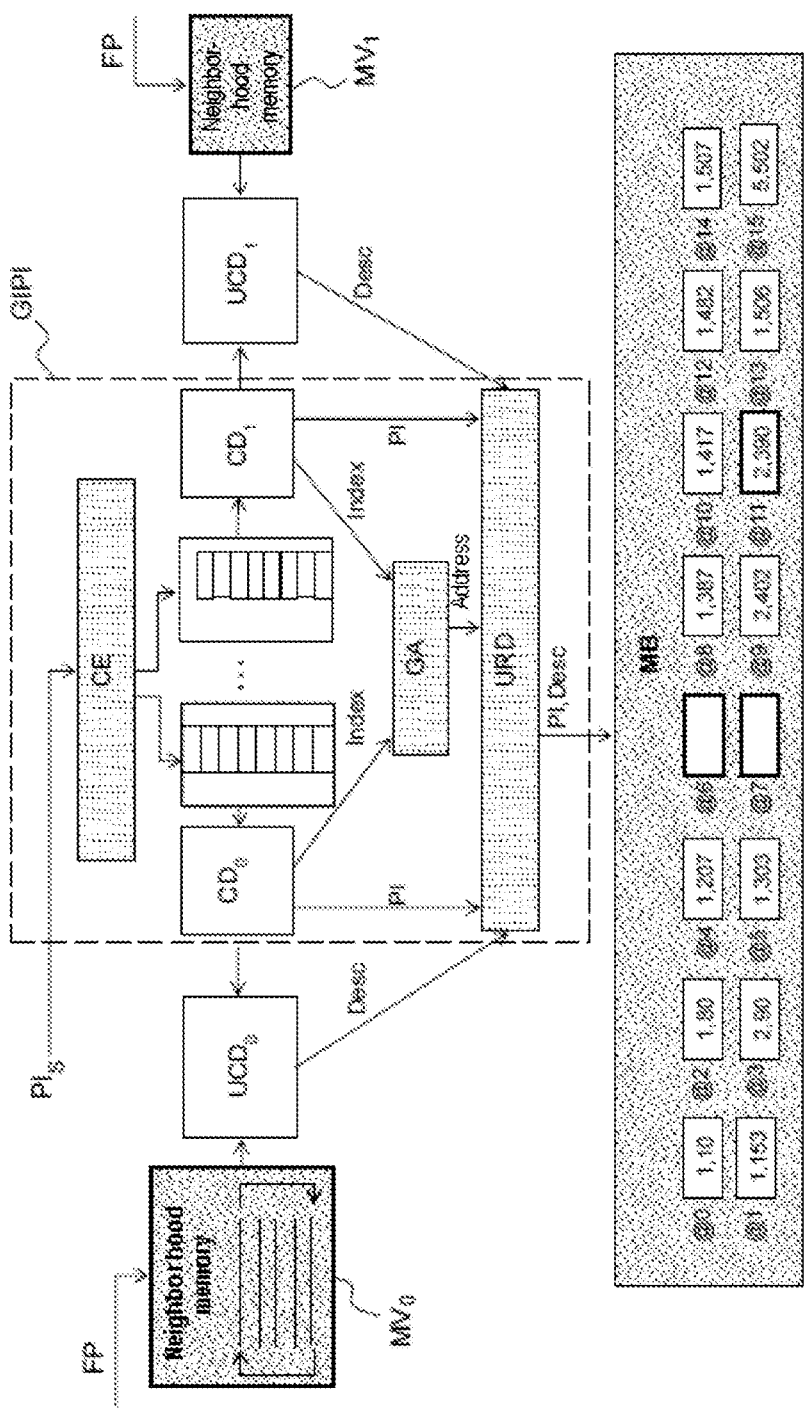

FIG. 4g illustrates placement into strip memory at the location associated with the index @15 of the last point of interest described.

Although in FIGS. 4a-4g, the content of the strip memory MB is represented solely by the coordinates of the points of interest, this is not the only information saved in memory since the result of the descriptor calculation is of course also saved.

The management of the unique indices for each point of interest allows a speculative calculation of the descriptors of points of interest. On completion of the phase of processing of an image strip by the module for selecting points of interest SIPI and the module for managing the calculation of the descriptors GIPI, a limited number of points of interest are retained and described, this number is at most equal to P points of interest per selection area of a strip, with P a parameter of the device.

When the descriptors recovery unit URD detects the passage to an image line belonging to the following image strip, it addresses another strip memory. The strip memories store at each memory location associated with an index, a data structure which contains at least the coordinates of the point of interest detected and its calculated descriptor. If other information is extracted by the detection module DPI, it can also be integrated into this data structure.

According to a second embodiment, the device 101 according to the invention can furthermore comprise a pairing module MA associated with one or more global strip memories MBG1, MBG2 of points of interest and descriptors as well as with a pairing calculation module CA such as represented in FIG. 2.

Figure 5:
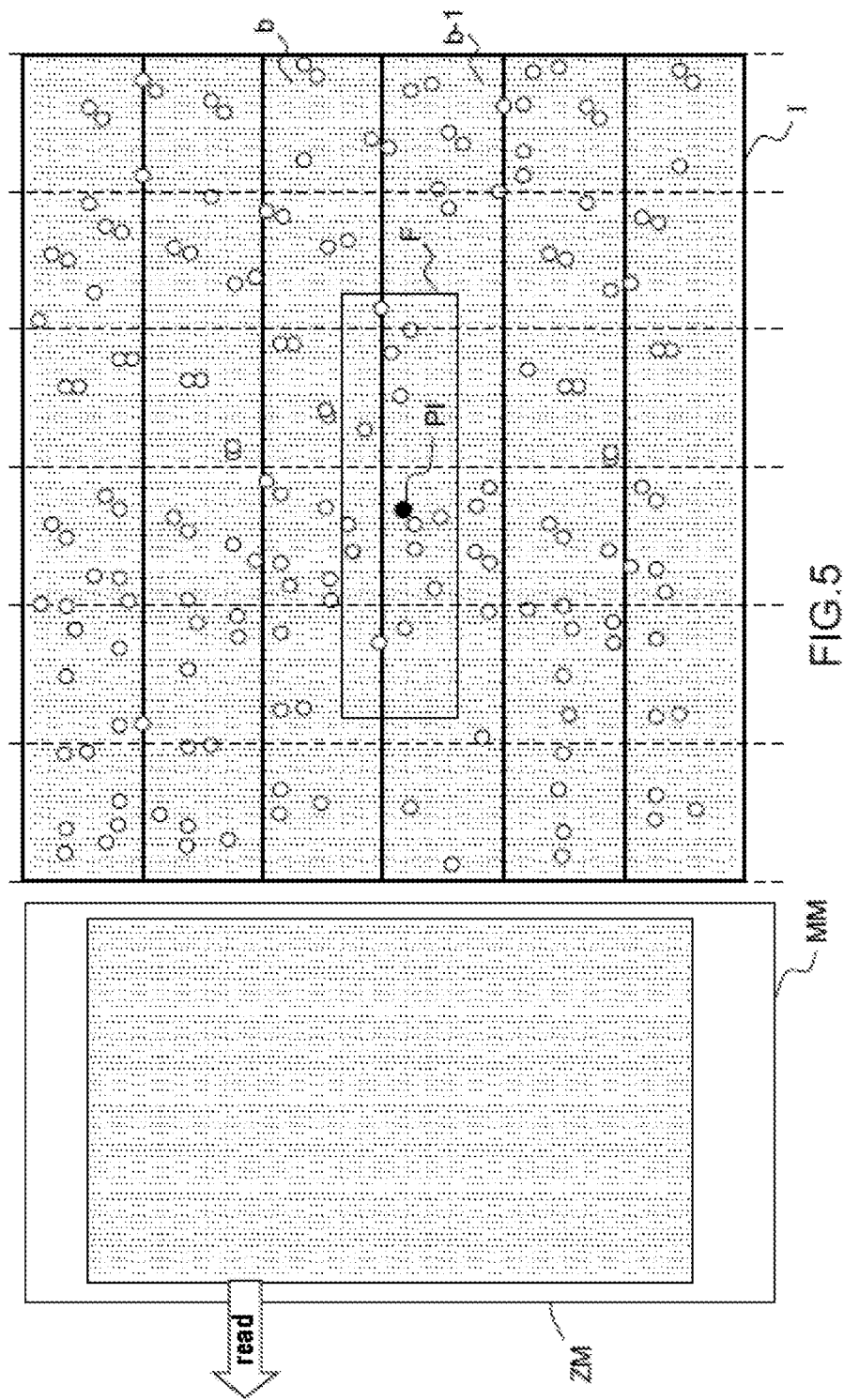

FIG. 5 shows diagrammatically the manner of operation of a device for pairing points of interest according to an architecture of the prior art.

The principle upon which a method for pairing points of interest is based consists mainly in carrying out the following steps. The pairing is performed between a first image, called the reference image, and a second image, called the test image.

According to the applications envisaged the test image can be:
  a preceding or earlier image, of the same stream of images as that to which the reference image belongs, for example for computer monovision applications,
  an image taken at the same moment as the reference image, but by another camera, for example for computer stereovision applications,
  an image arising from one or more trained models and whose points of interest are stored in memory, for example for applications involving refitting of models.

In FIG. 5 is represented a test image I as well as a unique memory MM which comprises a single memory area ZM in which all the points of interest corresponding to the test image I are stored.

The pairing method can be parametrized by a spatial filtering parameter which consists in defining a search area F in which the pairing is carried out. Stated otherwise, for each point of interest of the reference image, the point of interest of the test image which is closest to the point of interest of the reference image is searched for in the test image and within the search area F centered on the position of the point of interest of the reference image. The proximity criterion takes into account the descriptors of the points of interest and depends on the method used. This criterion can be based, for example, on a minimum distance according to the L1 norm of the descriptors.

A drawback of using a unique memory MM, such as illustrated in FIG. 5, is that the points of interest and their descriptors are stored in the memory MM in the form of a list without coherence with the spatial position of the points in the image. Therefore, when the pairing module performs the pairing of a point of interest, it must traverse the whole of the list of points of interest of the test image to test their position so as to verify whether they are present in the search area defined by the spatial filtering, and then perform the pairing calculation if this point does indeed belong to the search area. This type of architecture also presents the drawback of requiring a large number of memory accesses and calculations and of not allowing the pairing phase to begin until all the points of interest of the test image have been described.

The architecture of the device 101 according to the invention makes it possible, in particular, to resolve this drawback by using strip memories.

Figure 6:
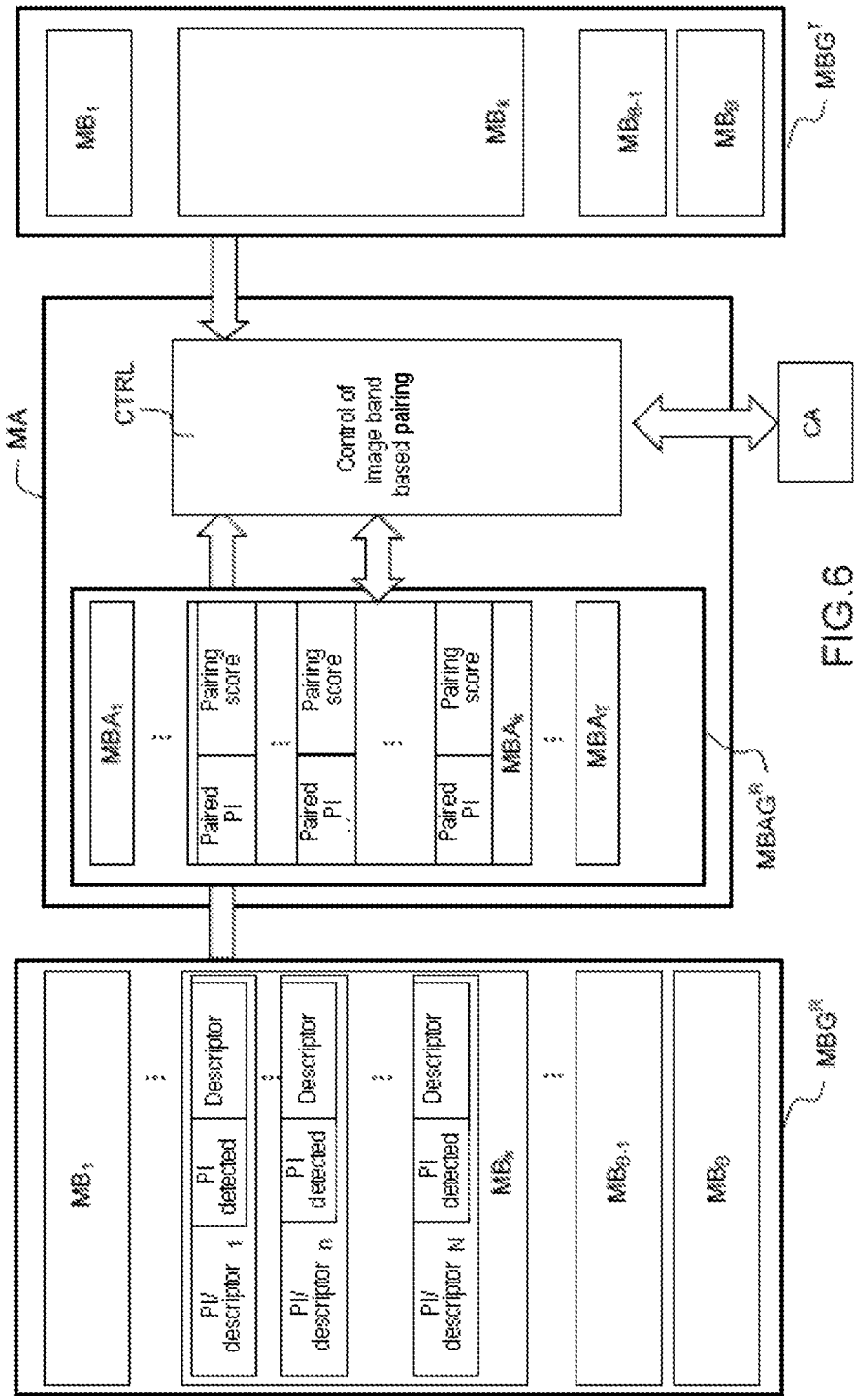
Figure 7:
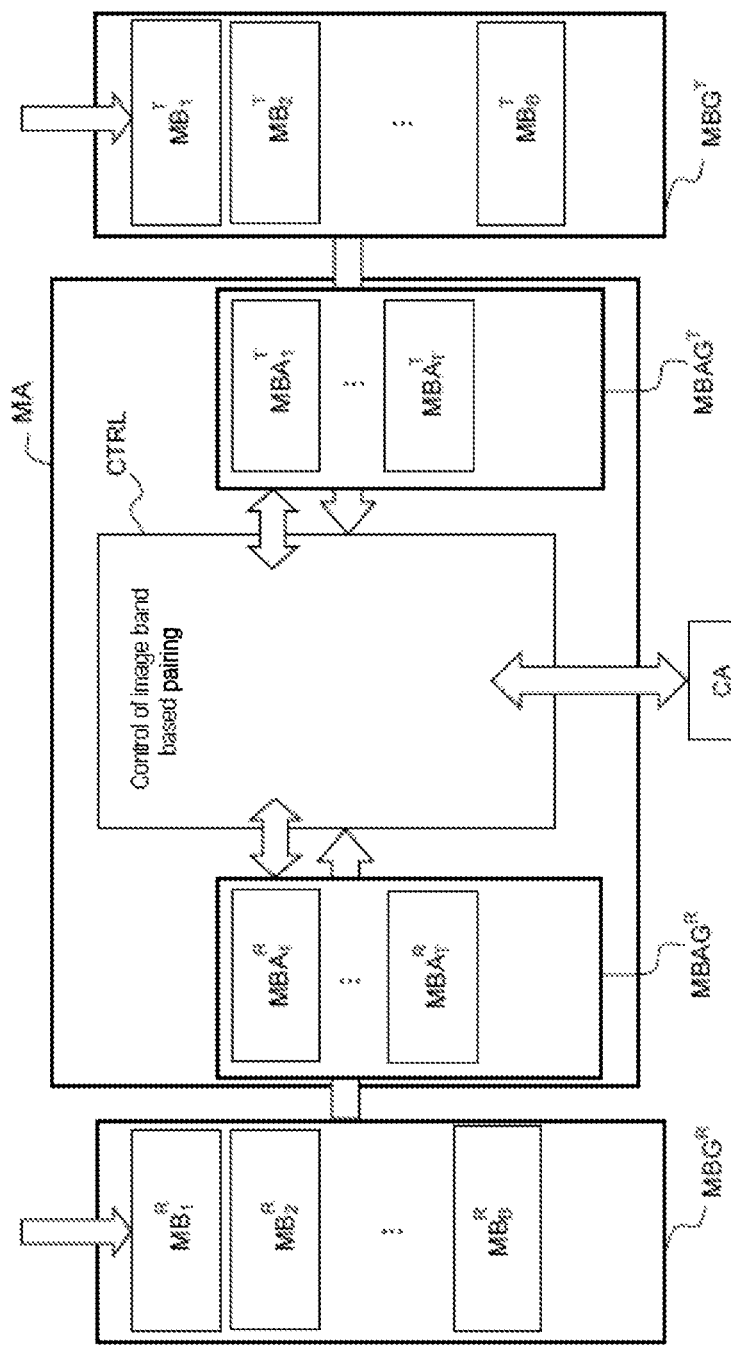
Figure 8:
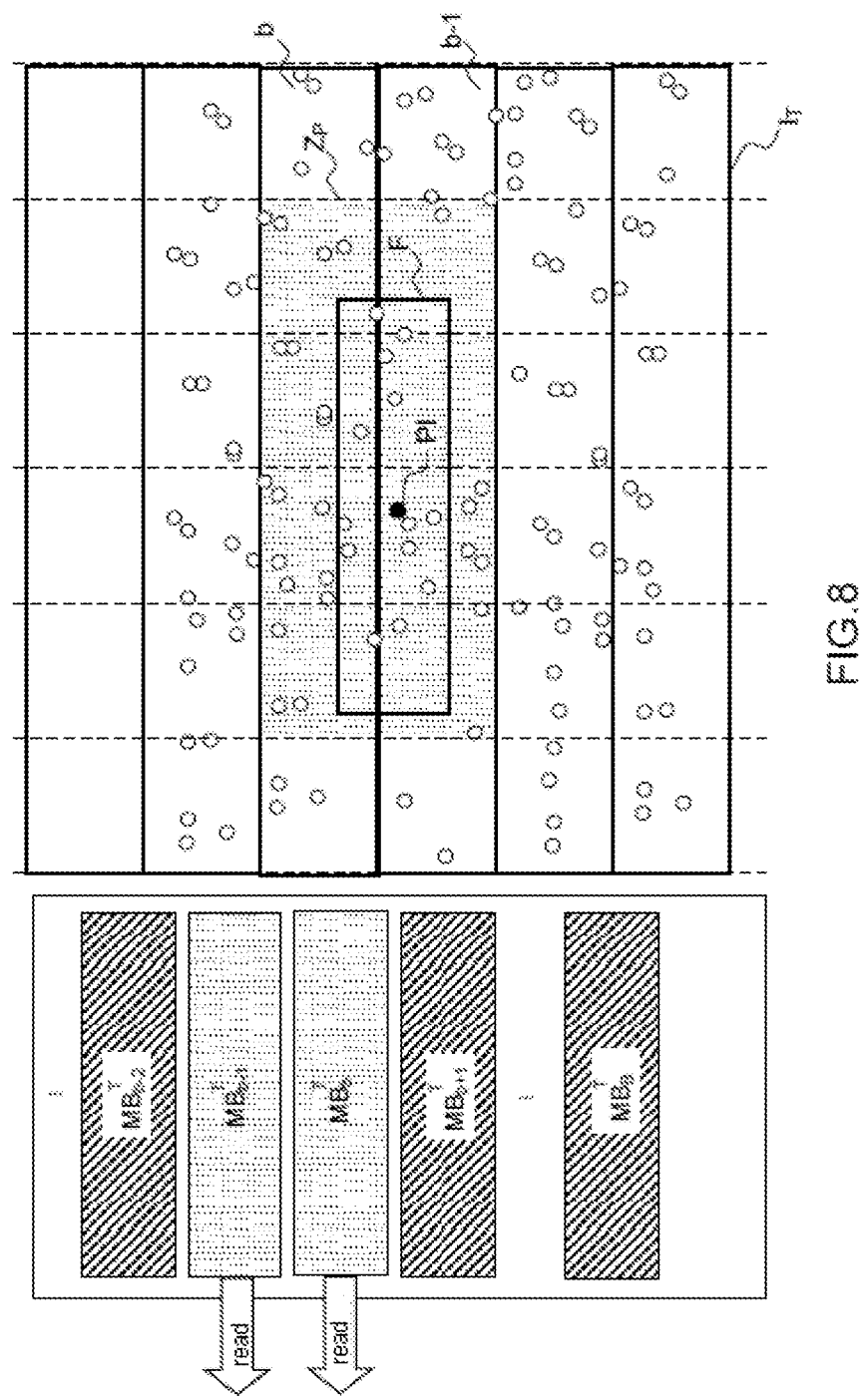

The manner of operation of the module MA for pairing points of interest according to the invention is now described with the support of FIGS. 6, 7 and 8.

FIG. 6 shows diagrammatically a pairing module MA connected to a first global memory $MBG^R$ comprising several PI/descriptor strip memories $MB_1, \ldots MB_B$ each corresponding to a strip of a first image. A strip memory $MB_k$ is able to save at least the selected points of interest retained and their associated descriptors. Other information characteristic of the points of interest can also be saved. The pairing module MA is also connected to a second global memory $MBG^T$ associated with a second image.

The pairing module MA mainly comprises an image band based pairing control module CTRL and a global pairing strip memory $MBAG^R$ comprising several pairing strip memories $MBA_1, \ldots MBA_k, \ldots MBA_T$. The pairing strip memories each correspond to a strip of an image. The number T of pairing strip memories can be less than the number B of PI/descriptor strip memories. Each pairing strip memory is able to save at least one paired point of interest and its pairing score. The pairing score is specific to the pairing method used and corresponds to an item of information in respect of proximity or resemblance between two points of interest. The calculation of the pairing score uses the descriptors of the points of interest. The pairing method implemented by the pairing module depends heavily on the point of interest description method used. The device according to the invention is compatible with any pairing method as long as the latter uses as input the characteristics of the points of interest, such as the associated descriptors, as well as the 2D position, the orientation or the scale. These data are accessible via the strip memories.

The pairing control module CTRL achieves the interface between the PI/descriptor strip memories $MB_1, \ldots MB_B$, the pairing strip memories $MBA_1, \ldots MBA_k, \ldots MBA_T$ and the pairing calculation module CA which implements the chosen pairing method. In particular, the pairing control module CTRL is able to read-access the PI/descriptor strip memories $MB_1, \ldots MB_B$ so as to read the points of interest detected and retained (identified by their spatial coordinates) as well as their associated descriptors and to communicate this information to the pairing calculation module. The pairing control module CTRL is also able to read-access and write-access the pairing strip memories $MBA_1, \ldots MBA_k, \ldots MBA_T$ to exchange with the pairing calculation module CA the current results of the pairing calculations (paired points of interest and pairing scores).

FIG. 7 gives another representation of the pairing module MA according to the invention including a global PI/descriptor strip memory $MBG^R$ comprising a suite of PI/descriptor strip memories $MB_1^R, \ldots MB_B^R$ associated with the points of interest of a reference image, a global pairing strip memory $MBAG^R$ comprising a suite of pairing strip memories $MBA_1^R, \ldots MBA_k^R, \ldots MBA_T^R$ associated with the paired points of interest of the reference image, a global PI/descriptor strip memory $MBG^T$ comprising a suite of PI/descriptor strip memories $MB_1^T, \ldots MB_B^T$ associated with the points of interest of a test image and a global pairing strip memory $MBAG^T$ comprising a suite of pairing strip memories $MBA_1^T, \ldots MBA_k^T, \ldots MBA_T^T$ associated with the paired points of interest of the test image.

The architecture of the pairing module MA according to the invention makes it possible to accelerate the global processings performed by the device 101 in particular because of the fact that while a first PI/descriptor strip memory $MB_1^R$ is being filled by the descriptors calculation management module GIPI, the pairing module MA can read-access other PI/descriptor strip memories to execute the pairing calculations.

This manner of operation is made possible by splitting up the processings by image strips.

FIG. 8 illustrates the implementation of the pairing module MA according to the invention. In this figure the test image $I_T$ and the current point of interest PI of the reference image that it is sought to pair with a point of interest of the test image is represented. The pairing method uses a spatial filtering with a search area F such as defined in FIG. 8. This search area straddles two strips b-1,b of the image. Thus, the pairing calculation only requires read-access to the two PI/descriptor strip memories $MB_{b-1}^T, MB_b^T$ of the test image which correspond to the two strips b-1,b. The invention makes it possible to thus limit the number of points of interest to be tested with respect to the architecture of the prior art using a global memory (FIG. 5).

The number of PI/descriptor strip memories to which the pairing module must have access depends on the size of the search area of the spatial filtering with respect to the size of the image strips.

Strip-wise processing makes it possible on the one hand to limit the number of accesses to the memory to repatriate the points of interest to be tested, the number of calculations of pairing scores and the number of comparisons in the search for the maximum score and on the other hand to allow the execution of the pairing phase in an iterative manner. The calculation is triggered as early as possible, without needing to calculate the entirety of the descriptors of the points of interest of the image, thus limiting the processing latency.

The pairing of a point is performed in an iterative manner, that is to say that a test point selected as best paired point may be reassessed in the course of the search. According to the pairing method used, a set of pairing strip memories is required in order to preserve the intermediate data, at least the best current paired point and the corresponding pairing score. The address used to access the data relating to the points of interest in the PI/descriptor strip memory is used to access these intermediate data.

A pairing strip memory stores the current paired point of interest as well as the pairing score at the same address as the corresponding point of interest in the PI/descriptor strip memory.

For an image, the number of PI/descriptor strip memories depends on the type of pairing performed as well as on the spatial filtering applied and on the type of image (reference or test). For the reference image, it is at least two (one for writing and one for reading) but will have to be equivalent to the number of strips covered by the spatial filtering+1 in the worst case. For the test image, it is at least two (one for writing and one for reading) but will have to be equivalent to the number of strips covered by the spatial filtering+1 in the worst case. In the case of temporal pairing, the number of test PI/descriptor strip memories may be equal to the number of strips in the image.

For an image, the number of pairing strip memories depends on the type of pairing performed as well as on the spatial filtering applied and on the type of image (reference or test). For the reference image, it is at least one (corresponding to the reference PI/descriptor strip memory undergoing reading) but will have to be equivalent to the number of strips covered by the spatial filtering in the worst case.

For the test image, it is at least equal to one but will have to be equivalent to the number of strips covered by the spatial filtering in the worst case.

The calculation device 100,101 according to the invention as a whole as well as each of the modules that it comprises may be implemented on the basis of hardware elements.

In particular, the device according to the invention as a whole as well as each of its modules taken separately may use one or more processors, one or more integrated circuits, one or more electronic components and one or more memories. The processor may be a generic processor, a specific processor, an Application-Specific Integrated Circuit (ASIC) or a Field-Programmable Gate Array (FPGA).

The invention claimed is:

1. A calculation device for the selection and the description of points of interest in at least one image decomposed into a plurality of strips, said device comprising:
    a first module for selecting and indexing points of interest from among a set of points of interest detected in the image, said first module being configured to select, in each strip, at most a fixed number P of candidate points of interest, and associate a unique index with them,
    a second module for managing calculation of descriptors for the candidate points of interest,
    the first module being configured to transmit the candidate points of interest and their index to the second module immediately at the end of the processing of K lines of a strip, with K an integer number greater than or equal to 1 and strictly less than the number of lines per strip.

2. The calculation device of claim 1, furthermore comprising at least one neighborhood memory interfaced with the second module for the calculation of descriptors of points of interest and a synchronization circuit able to receive a sequence of images in the form of a stream of pixels and to transmit said stream of pixels to the neighborhood memory with a delay configured to synchronize the content of the neighborhood memory with the calculation of a descriptor of a current point of interest.

3. The calculation device of claim 2, in which said at least one neighborhood memory is dimensioned to contain solely an area of an image necessary for the calculation of the descriptors for the points of interest corresponding to K lines of one or more selection areas of a strip.

4. The calculation device of claim 1, in which the selection of P points of interest which is effected by the first module consists in selecting, at a given instant, the P points of interest having the highest detection score or the lowest detection score or in selecting the P points of interest in a chronological or random order.

5. The calculation device of claim 1, in which the second module comprises at least one queue configured to receive the candidate points of interest transmitted by the first module for selecting points of interest, at least one control facility for calculating descriptors of points of interest and designed to cooperate with at least one unit for calculating descriptors of points of interest, at least one strip memory dimensioned to save the candidate points of interest and their calculated descriptors at a unique address and an addressing management facility configured to generate said unique address on the basis of at least the unique index provided by the first selection module.

6. The calculation device of claim 1, in which each strip is furthermore decomposed into a plurality of selection areas, the selection of P points of interest being effected per selection area.

7. The calculation device of claim 6, in which said unique address is furthermore generated on the basis of an identifier of the selection area of the point of interest to be saved.

8. The calculation device of claim 6, in which the second module comprises a control facility for calculating descriptors of points of interest and a queue for one or more selection area(s).

9. The calculation device of claim 1, furthermore comprising a third module for pairing points of interest detected and selected in a reference image and a test image on the basis of their associated descriptors saved respectively in a first set of strip memories and a second set of strip memories, said third pairing module being configured to independently read-access any one of the strip memories associated with the reference image and with the test image.

10. The calculation device of claim 9, in which the third pairing module comprises a pairing control facility for piloting a pairing calculation unit, a set of pairing strip memories which is associated with the reference image and a set of pairing strip memories which is associated with the test image, each pairing strip memory being able to save at least one point of interest and a pairing score.

11. The calculation device of claim 9, in which the pairing is carried out in a spatial search area of the image by comparing each point of interest to be paired of the reference image saved in a strip memory with the points of interest of the test image which are situated in the spatial search area centered on the position of the point of interest to be paired and are saved in at least one strip memory, the pairing search being limited to the strip memories of the test image which correspond to strips of the test image which have a non-empty intersection with the spatial search area.

12. The calculation device of claim 9, in which the reference image and the test image are temporally successive images or are images of the same scene originating from two different streams of images.

\* \* \* \* \*